(12) United States Patent
Nakahori

(10) Patent No.: US 9,787,197 B2
(45) Date of Patent: Oct. 10, 2017

(54) SWITCHING POWER SUPPLY UNIT

(71) Applicant: TDK CORPORATION, Tokyo (JP)

(72) Inventor: Wataru Nakahori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/295,429

(22) Filed: Oct. 17, 2016

(65) Prior Publication Data

US 2017/0126136 A1    May 4, 2017

(30) Foreign Application Priority Data

Oct. 29, 2015   (JP) .................................. 2015-212748

(51) Int. Cl.
  *H02M 3/335*  (2006.01)
  *H02M 3/337*  (2006.01)
  *H02M 1/00*   (2006.01)

(52) U.S. Cl.
  CPC ..... *H02M 3/33507* (2013.01); *H02M 3/3376* (2013.01); *H02M 2001/0048* (2013.01); *H02M 2001/0058* (2013.01)

(58) Field of Classification Search
  CPC .. H02M 3/285; H02M 3/335; H02M 3/33507; H02M 3/3376; H02M 3/3378; H02M 2007/4815; H02M 2001/0032; H02M 2001/048; H02M 2001/58; H02M 2001/0077
  See application file for complete search history.

(56) References Cited

U.S. PATENT DOCUMENTS

| | | | |
|---|---|---|---|
| 6,310,785 B1 | 10/2001 | Ayyanar et al. | |
| 6,483,723 B2 * | 11/2002 | Kuranuki | H02M 1/34 363/132 |
| 6,611,444 B2 | 8/2003 | Ayyanar et al. | |
| 6,995,987 B2 | 2/2006 | Song et al. | |
| 7,272,020 B2 | 9/2007 | Lehman et al. | |
| 7,746,670 B2 * | 6/2010 | Kawasaki | H02M 3/33576 363/20 |

(Continued)

OTHER PUBLICATIONS

Ye, Zhong, "Dual Half-Bridge DC/DC Converter with Wide-Range ZVS and Zero Circulating Current," 2010 Texas Instruments Power Supply Design Seminar SEM1900, Topic 6 TI Literature No. SLUP266 c 2010, 2011 Texas Instruments Incorporated.

*Primary Examiner* — Matthew Nguyen
(74) *Attorney, Agent, or Firm* — Oliff PLC

(57) ABSTRACT

A switching power supply unit includes input terminals, output terminals, first to third primary windings and first to third secondary windings, a switching circuit, a rectifying smoothing circuit, and a driver. In the switching circuit, first and second switching devices, third and fourth switching devices, and first and second capacitors, coupled in series to one another, are disposed in parallel between the input terminals. In the rectifying smoothing circuit, first to third arms, each having two of rectifying devices disposed in series, are disposed in parallel between the output terminals, the first secondary winding is coupled between the first and the second arms to form an H-bridge coupling, the second and the third secondary windings are coupled between the second and the third arms to form an H-bridge coupling, and a choke coil is disposed between the first to the third arms and an output capacitor.

15 Claims, 14 Drawing Sheets

(56) References Cited

U.S. PATENT DOCUMENTS

| | | |
|---|---|---|
| 8,102,161 B2 | 1/2012 | Nakahori |
| 8,780,585 B2 | 7/2014 | Ye |
| 9,118,254 B2 | 8/2015 | Kim et al. |
| 9,240,723 B2* | 1/2016 | Boysen ............... H02M 3/3376 |
| 2009/0196072 A1 | 8/2009 | Ye |
| 2011/0096581 A1* | 4/2011 | Hallak .................... H02M 1/34 |
| | | 363/132 |
| 2011/0254528 A1* | 10/2011 | Danesh-Pajooh- |
| | | Nejad ............... H02M 3/33584 |
| | | 323/311 |
| 2013/0033904 A1 | 2/2013 | Ye |

* cited by examiner

SWITCHING POWER SUPPLY UNIT

CROSS REFERENCE TO RELATED APPLICATIONS

This application claims the benefit of Japanese Priority Patent Application JP2015-212748 filed on Oct. 29, 2015, the entire contents of which are incorporated herein by reference.

BACKGROUND

The invention relates to a switching power supply unit that performs voltage conversion with one or more switching devices.

As some examples of a switching power supply unit, various DC-DC converters have been proposed and put into practical use (for example, refer to United States Patent Application Publication No. 2009/0196072 and U.S. Pat. No. 8,780,585). A DC-DC converter used for this purpose generally includes a switching circuit (an inverter circuit) including switching devices, a power conversion transformer (or a transformer element), and a rectifying smoothing circuit.

SUMMARY

In a switching power supply unit such as the DC-DC converter, enhancement in power conversion efficiency has been pursued in general.

It is desirable to provide a switching power supply unit that makes it possible to facilitate enhancement in power conversion efficiency.

A switching power supply unit according to an illustrative embodiment of the invention includes: a pair of input terminals that receives an input voltage; a pair of output terminals that outputs an output voltage; first to third primary windings and first to third secondary windings that form three transformers; a switching circuit disposed between the pair of input terminals and the first to the third primary windings, and including first to fourth switching devices and first and second capacitors; a rectifying smoothing circuit provided between the pair of output terminals and the first to the third secondary windings, and including six rectifying devices, a choke coil, and an output capacitor that is disposed between the pair of output terminals; and a driver that performs a switching drive that controls operation of the first to the fourth switching devices. In the switching circuit, the first and the second switching devices coupled in series to one another through a first connection point, the third and the fourth switching devices coupled in series to one another through a second connection point, and the first and the second capacitors coupled in series to one another through a third connection point are disposed in parallel to one another between the pair of input terminals, the first primary winding is inserted between the first and the third connection points, the second primary winding is inserted between the second and the third connection points, and the third primary winding is inserted between the first and the second connection points. In the rectifying smoothing circuit, first to third arms are disposed in parallel to one another between the pair of output terminals, the first to the third arms each having two of the rectifying devices disposed in series to one another in a same orientation, the first secondary winding is coupled between the first and the second arms to form an H-bridge coupling, the second and the third secondary windings coupled in series to one another are coupled between the second and the third arms to form an H-bridge coupling, and the choke coil is disposed between the first to the third arms and the output capacitor.

DETAILED DESCRIPTION

In the following, some example embodiments of the invention are described in detail with reference to the accompanying drawings. It is to be noted that the description is given in the following order.

1. Example Embodiment (an example in which six rectifying devices are provided in a rectifying smoothing circuit)
2. Modification Examples Modification Example 1 (an example in which eight rectifying devices are provided in a rectifying smoothing circuit)

Modification Example 2 (an example in which capacitors adapted to prevent biased excitation are provided inside a switching circuit)

Modification Example 3 (an example in which rectifying devices that may serve as reverse voltage clamps are provided in a switching circuit)

Modification Example 4 (another example of a configuration of a choke coil inside a rectifying smoothing circuit)

3. Other Modification Examples

1. Example Embodiment

[Configuration]

Figure 1:
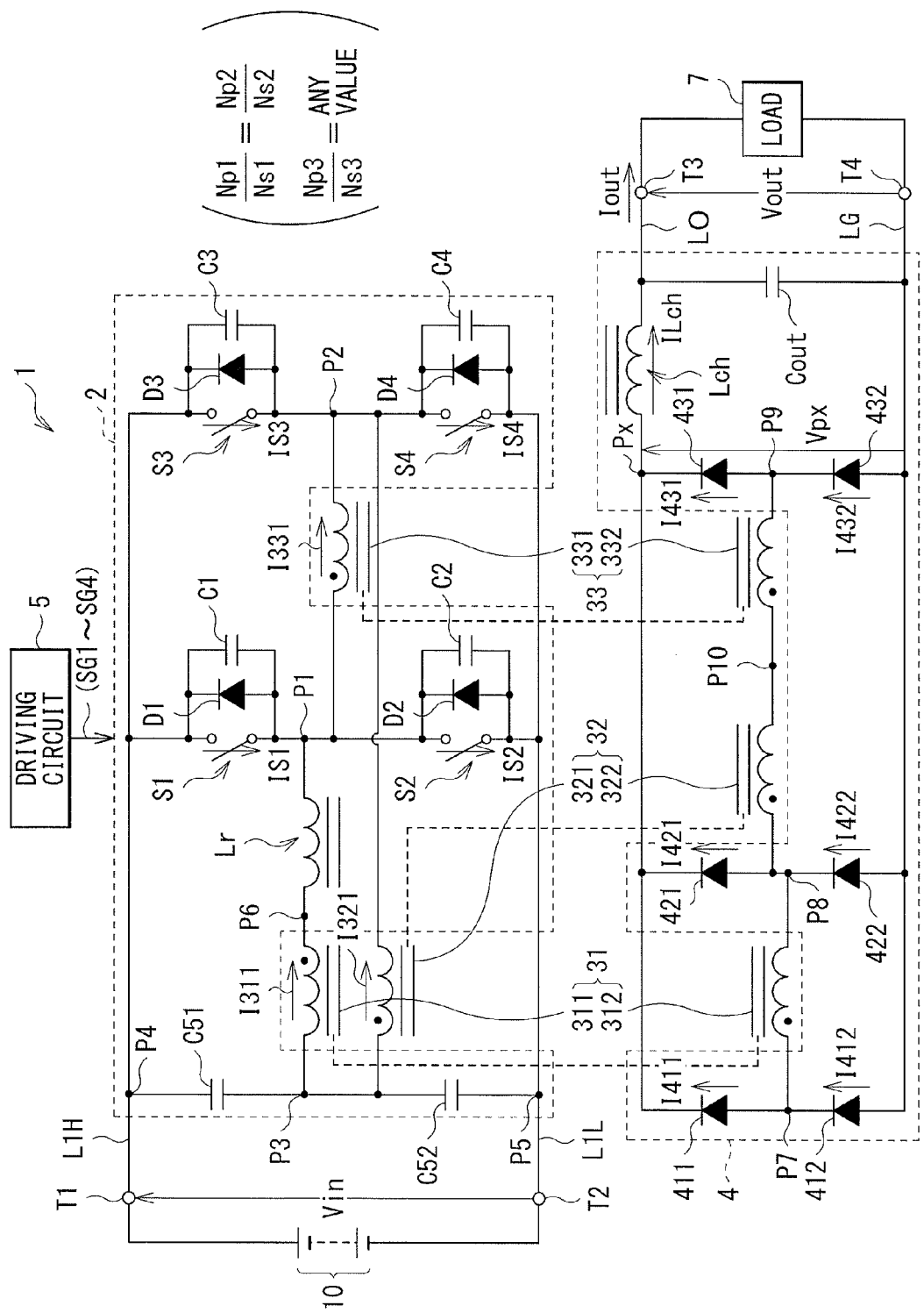
FIG. 1 is a circuit diagram of an example of an overall configuration of a switching power supply unit according to an example embodiment of the invention.

FIG. 1 illustrates, in a form of a circuit diagram, an example of an overall configuration of a switching power supply unit (a switching power supply unit 1) according to an example embodiment of the invention. The switching power supply unit 1 may function as a DC-DC converter that performs voltage conversion of a direct-current input voltage Vin supplied from a battery 10 (a first battery) to a direct-current output voltage Vout, and supplies the direct-current output voltage Vout to an undepicted second battery to drive a load 7. Here, the voltage conversion in the switching power supply unit 1 may take either form of up-conversion (voltage boosting) or down-conversion (voltage dropping).

It is to be noted that the direct-current input voltage Vin corresponds to one specific but non-limiting example of an "input voltage" of one embodiment of the invention, and the direct-current output voltage Vout corresponds to one specific but non-limiting example of an "output voltage" of one embodiment of the invention.

The switching power supply unit 1 may include two input terminals T1 and T2, two output terminals T3 and T4, a switching circuit 2, three transformers 31, 32, and 33, a rectifying smoothing circuit 4, and a driving circuit 5. The direct-current input voltage Vin may be inputted to between the input terminals T1 and T2. The direct-current output voltage Vout may be outputted from between the output terminals T3 and T4.

It is to be noted that the input terminals T1 and T2 correspond to one specific but non-limiting example of a "pair of input terminals" of one embodiment of the invention, and the output terminals T3 and T4 correspond to one specific but non-limiting example of a "pair of output terminals" of one embodiment of the invention. In addition, the transformers 31, 32, and 33 correspond to one specific but non-limiting example of "three transformers" of one embodiment of the invention. The transformers 31, 32, and 33 also correspond to one specific but non-limiting example of a "first transformer", one specific but non-limiting example of a "second transformer", and one specific but non-limiting example of a "third transformer", respectively, of one embodiment of the invention.

It is to be noted that, in the switching power supply unit 1, an input smoothing capacitor Cin may be disposed between a primary high-voltage line L1H and a primary low-voltage line L1L. The primary high-voltage line L1H may be coupled to the input terminal T1, while the primary low-voltage line L1L may be coupled to the input terminal T2. In one specific but non-limiting example, a first end of the input smoothing capacitor Cin may be coupled to the primary high-voltage line L1H, and a second end of the input smoothing capacitor Cin may be coupled to the primary low-voltage line L1L. The input smoothing capacitor Cin may be a capacitor adapted to smooth the direct-current input voltage Vin inputted from the input terminals T1 and T2. It is to be noted that in the example of the circuit configuration illustrated in FIG. 1, two capacitors C51 and C52 inside the switching circuit 2 to be described later may also function as input smoothing capacitors. The input smoothing capacitor Cin may be therefore eliminated in this example.

[Switching Circuit 2]

The switching circuit 2 is disposed between the input terminals T1 and T2, and primary windings 311, 321, and 331 in the respective transformers 31, 32, and 33 to be described later. The switching circuit 2 may include four switching devices S1 to S4, four diodes D1 to D4, and six capacitors C1 to C4, C51, and C52, and a resonance inductor Lr, as illustrated in FIG. 1. In the switching circuit 2, the switching devices S1 and S2, the switching devices S3 and S4, and the capacitors C51 and C52 are disposed in parallel to one other between the input terminals T1 and T2, as illustrated in FIG. 1.

It is to be noted that, the switching devices S1 to S4 correspond to one specific but non-limiting example of a "first switching device", one specific but non-limiting example of a "second switching device", one specific but non-limiting example of a "third switching device", and one specific but non-limiting example of a "fourth switching device", respectively, of one embodiment of the invention. In addition, the capacitors C51 and C52 correspond to one specific but non-limiting example of a "first capacitor" and one specific but non-limiting example of a "second capacitor", respectively, of one embodiment of the invention.

Figure 2:
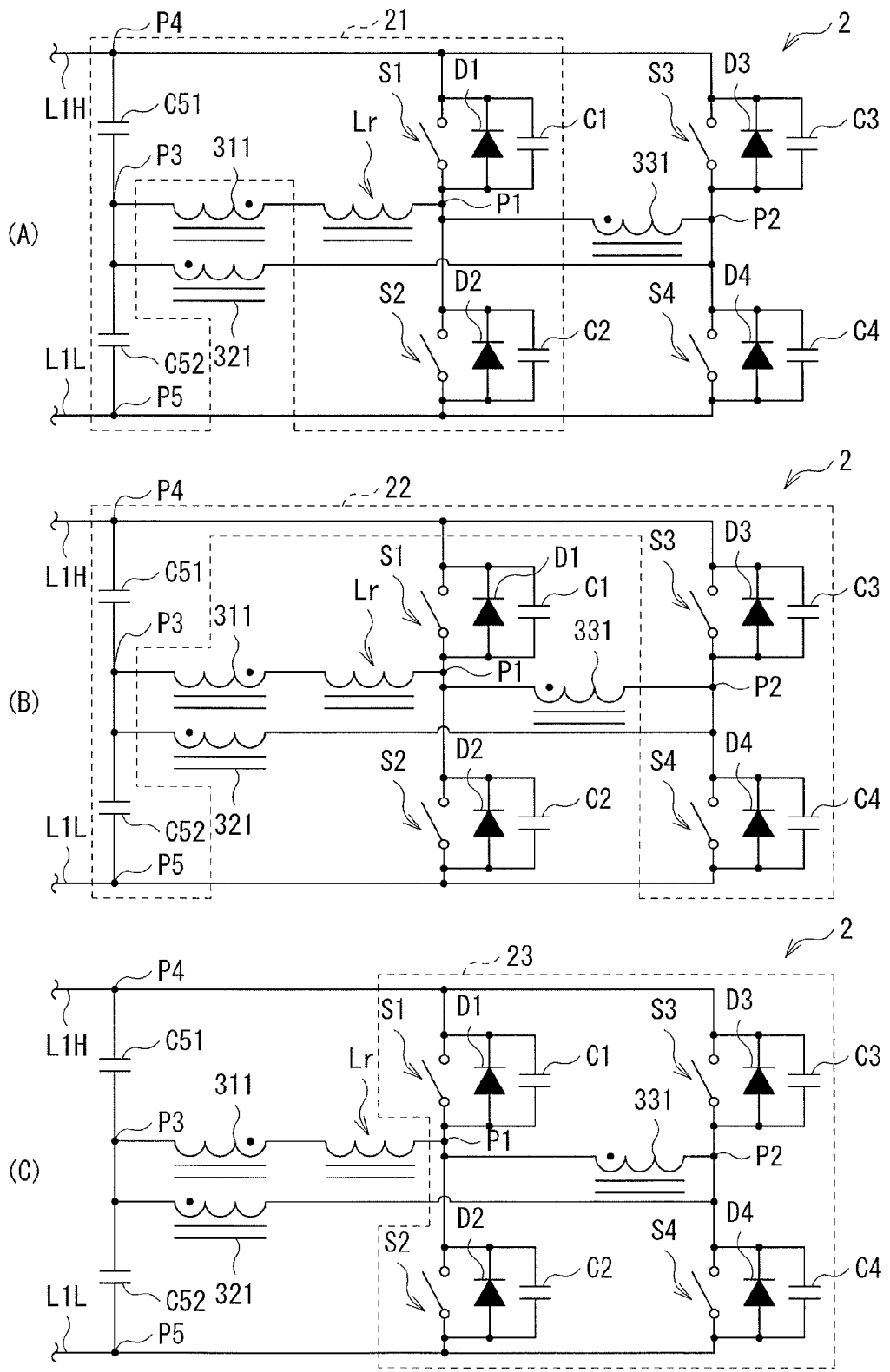
FIG. 2 is a circuit diagram of an example of a detailed configuration of a switching circuit illustrated in FIG. 1.

Here, FIG. 2 illustrates an example of a detailed configuration of the switching circuit 2, in a form of a circuit diagram. The switching circuit 2 may include three bridge circuits, as illustrated in (A) to (C) of FIG. 2. In one specific but non-limiting example, the switching circuit 2 may include a half-bridge circuit 21 illustrated in (A) of FIG. 2, a half-bridge circuit 22 illustrated in (B) of FIG. 2, and a full-bridge circuit 23 illustrated in (C) of FIG. 2.

It is to be noted that the half-bridge circuit 21 corresponds to one specific but non-limiting example of a "first half-bridge circuit" of one embodiment of the invention, the half-bridge circuit 22 corresponds to one specific but non-limiting example of a "second half-bridge circuit" of one embodiment of the invention.

The half-bridge circuit 21 may include the two switching devices S1 and S2, the capacitors C1 and C2 as well as the diodes D1 and D2 coupled in parallel to the switching devices S1 and S2, respectively, the two capacitors C51 and C52, and the resonance inductor Lr, as illustrated in (A) of FIG. 2. The half-bridge circuit 22 may include the two switching devices S3 and S4, the capacitors C3 and C4 as well as the diodes D3 and D4 coupled in parallel to the switching devices S3 and S4, respectively, and the two capacitors C51 and C52, as illustrated in (B) of FIG. 2. In other words, the capacitors C51 and C52 serve as devices shared between the two half-bridge circuits 21 and 22. The full-bridge circuit 23 may include the four switching devices S1 to S4, the four diodes D1 to D4, and the four capacitors C1 to C4. In other words, the switching devices S1 and S2, the diodes D1 and D2, and the capacitors C1 and C2 serve as devices shared between the half-bridge circuit 21 and the full-bridge circuit 23. The switching devices S3 and S4, the diodes D3 and D4, and the capacitors C3 and C4 serve as devices shared between the half-bridge circuit 22 and the full-bridge circuit 23. It is to be noted that the diodes D1 to D4 each may include a cathode disposed on primary high-voltage line L1H side, and an anode disposed on primary low-voltage line L1L side. In other words, the diodes D1 to D4 may be in a backward-coupled state.

In the half-bridge circuit 21, first ends of the switching devices S1 and S2, first ends of the capacitors C1 and C2, the anode of the diode D1, and the cathode of the diode D2 may be coupled together at a connection point P1, as illustrated in (A) of FIG. 2. First ends of the capacitors C51 and C52 may be coupled together at a connection point P3. A second end of the switching device S1, a second end of the capacitor C1, the cathode of the diode D1, and a second end of the capacitor C51 may be coupled together at a connection point P4 on the primary high-voltage line L1H. A second end of the switching device S2, a second end of the capacitor C2, the anode of the diode D2, and a second end of the capacitor C52 may be coupled together at a connection point P5 on the primary low-voltage line L1L. Between the connection points P1 and P3, the primary winding 311 of the transformer 31 to be described later and the resonance inductor Lr may be inserted in a serially-coupled state. In one specific but non-limiting example, a first end of the primary winding 311 may be coupled to the connection point 3; a second end of the primary winding 311 and a first end of the resonance inductor Lr may be coupled together at a connection point 6; and a second end of the resonance inductor Lr may be coupled to the connection point P1. With this configuration, in the half-bridge circuit 21, the switching devices S1 and S2 may be respectively turned on and off in accordance with drive signals SG1 and SG2 supplied from the driving circuit 5 to be described later. This allows the direct-current input voltage Vin applied to between the input terminals T1 and T2 to be converted to an alternating-current voltage, and the alternating-current voltage thus converted may be outputted to the transformer 31.

In the half-bridge circuit 22, first ends of the switching devices S3 and S4, first ends of the capacitors C3 and C4, the anode of the diode D3, and the cathode of the diode D4 may be coupled together at a connection point P2, as illustrated in (B) of FIG. 2. A second end of the switching device S3, a second end of the capacitor C3, the cathode of the diode D3, and the second end of the capacitor C51 may be coupled together at the connection point P4 as mentioned above. A second end of the switching device S4, a second end of the capacitor C4, the anode of the diode D4, and the second end of the capacitor C52 may be coupled together at the connection point P5 as mentioned above. Between the connection points P2 and P3, the primary winding 321 of the transformer 32 to be described later may be inserted. With this configuration, in the half-bridge circuit 22 as well, the switching devices S3 and S4 may be respectively turned on and off in accordance with drive signals SG3 and SG4 supplied from the driving circuit 5 to be described later. This allows the direct-current input voltage Vin to be converted to an alternating-current voltage, and the alternating-current voltage thus converted may be outputted to the transformer 32.

In the full-bridge circuit 23, the first ends of the switching devices S1 and S2, the first ends of the capacitors C1 and C2, the anode of the diode D1, and the cathode of the diode D2 may be coupled together at the connection point P1, as illustrated in (C) of FIG. 2. The first ends of the switching devices S3 and S4, the first ends of the capacitors C3 and C4, the anode of the diode D3, and the cathode of the diode D4 may be coupled together at the connection point P2. The second end of the switching device S1, the second end of the capacitor C1, the cathode of the diode D1, the second end of the switching device S3, the second end of the capacitor C3, and the cathode of the diode D3 may be coupled together at the connection point P4 as mentioned above. The second end of the switching device S2, the second end of the capacitor C2, the anode of the diode D2, the second end of the switching device S4, the second end of the capacitor C4, and the anode of the diode D4 may be coupled together at the connection point P5 as mentioned above. Between the connection points P1 and P2, the primary winding 331 of the transformer 33 to be described later may be inserted. With this configuration, in the full-bridge circuit 23 as well, the switching devices S1 to S4 may be respectively turned on and off in accordance with drive signals SG1 to SG4 supplied from the driving circuit 5 to be described later. This allows the direct-current input voltage Vin to be converted to an alternating-current voltage, and the alternating-current voltage thus converted may be outputted to the transformer 33.

Here, non-limiting examples of switching devices used as the switching devices S1 to S4 may include field effect transistors (MOS-FETs or Metal Oxide Semiconductor-Field Effect Transistors) and IGBTs (Insulated Gate Bipolar Transistors). With MOS-FETs used as the switching devices S1 to S4, the capacitors C1 to C4 and the diodes D1 to D4 may be configured of parasitic capacitances and parasitic diodes of the respective MOS-FETs. In another alternative, the capacitors C1 to C4 may be configured of junction capacitances of the respective diodes D1 to D4. With such configurations, it is not necessary to provide the capacitors C1 to C4 and the diodes D1 to D4 separately from the switching devices S1 to S4. This allows for simplification of the circuit configuration of the switching circuit 2 (the half-bridge circuits 21 and 22, and the full-bridge circuit 23).

It is to be noted that the connection points P1, P2, and P3 mentioned above corresponds to one specific but non-limiting example of a "first connection point", one specific but non-limiting example of a "second connection point", and one specific but non-limiting example of a "third connection point", respectively, of one embodiment of the invention.

[Transformers 31 to 33]

The transformer 31 includes the primary winding 311 and a secondary winding 312 magnetically coupled to one another, as illustrated in FIG. 1. The primary winding 311 may include a first end coupled to the first connection point P3, and a second end coupled to the connection point P6. The secondary winding 312 may include a first end coupled to a connection point P7 inside the rectifying smoothing circuit 4 to be described later, and a second end coupled to a connection point P8 inside the rectifying smoothing circuit 4. It is to be noted that, in FIG. 1, a winding start position of each of the primary winding 311 and the secondary winding 312 is indicated with a black circle mark ("●"), and this holds true for the following description. The transformer 31 is adapted to perform voltage conversion of the alternating-current voltage generated by the half-bridge circuit 21 (i.e., the alternating-current voltage inputted to the transformer 31), and to output the alternating-current voltage thus voltage-converted, from an end of the secondary winding 312. It is to be noted that a degree of the voltage conversion in this case may be determined by a turn ratio (=Np1/Ns1) between a number-of-winding-turns Np1 in the primary winding 311 and a number-of-winding-turns Ns1 in the secondary winding 312 (FIG. 1).

Similarly, the transformer 32 includes the primary winding 321 and the secondary winding 322 magnetically coupled to one another (magnetically coupled), as illustrated in FIG. 1. The primary winding 321 may include a first end coupled to the connection point P3, and a second end coupled to the connection point P2. The secondary winding 322 may include a first end coupled to the connection point P8 inside the rectifying smoothing circuit 4 to be described later, and a second end coupled to a connection point P10 inside the rectifying smoothing circuit 4. It is to be noted that, in FIG. 1, a winding start position of each of the primary winding 321 and the secondary winding 322 is indicated with a black circle mark, and this holds true for the following description. The transformer 32 is adapted to perform voltage conversion of the alternating-current voltage generated by the half-bridge circuit 22 (i.e., the alternating-current voltage inputted to the transformer 32), and to output the alternating-current voltage thus voltage-converted from an end of the secondary winding 322. It is to be noted that a degree of the voltage conversion in this case may be also determined by a turn ratio (=Np2/Ns2) of a number-of-winding-turns Np2 in the primary winding 321 and a number-of-winding-turns Ns2 in the secondary winding 322 (FIG. 1).

Similarly, the transformer 33 includes the primary winding 331 and the secondary winding 332 magnetically coupled to one another (magnetically coupled), as illustrated in FIG. 1. The primary winding 331 may include a first end coupled to the connection point P1, and a second end coupled to the connection point P2. The secondary winding 332 may include a first end coupled to the connection point P10 inside the rectifying smoothing circuit 4 to be described later, and a second end coupled to a connection point P9 inside the rectifying smoothing circuit 4. It is to be noted that, in FIG. 1, a winding start position of each of the primary winding 331 and the secondary winding 332 is indicated with a black circle mark, and this holds true for the following description. The transformer 33 is adapted to perform voltage conversion of the alternating-current voltage generated by the full-bridge circuit 23 (i.e., the alternating-current voltage inputted to the transformer 33), and to output the alternating-current voltage thus voltage-converted from an end of the secondary winding 332. It is to be noted that a degree of the voltage conversion in this case may be also determined by a turn ratio (=Np3/Ns3) of a number-of-winding-turns Np3 in the primary winding 331 and a number-of-winding-turns Ns3 in the secondary winding 332 (FIG. 1).

Here, in the example embodiment, as illustrated in FIG. 1 and represented by the following Expression (1), the turn ratio (=Np1/Ns1) of the number-of-winding-turns Np1 in the primary winding 311 and the number-of-winding-turns Ns1 in the secondary winding 312 in the transformer 31, and the turn ratio (=Np2/Ns2) of the number-of-winding-turns Np2 in the primary winding 321 and the number-of-winding-turns Ns2 in the secondary winding 322 in the transformer 32, may be equal to one another. In addition, in the example embodiment, as illustrated in FIG. 1, any value may be set for the turn ratio (=Np3/Ns3) of the number-of-winding-turns Np3 in the primary winding 331 and the number-of-winding-turns Ns3 in the secondary winding 332, depending on, for example, an application of the switching power supply unit 1 or specifications of a product. In other words, the turn ratio (Np3/Ns3) in the transformer 33 may be a value equal to or different from (a large value or a small value) a turn ratio (Np1/Ns1=Np2/Ns2) in the transformers 31 and 32.

$$(Np1/Ns1)=(Np2/Ns2) \tag{1}$$

It is to be noted that the primary windings 311, 321, and 331 correspond to one specific but non-limiting example of a "first primary winding", one specific but non-limiting example of a "second primary winding", and one specific but non-limiting example of a "third primary winding", respectively, of one embodiment of the invention. In addition, the secondary windings 312, 322, and 332 correspond to one specific but non-limiting example of a "first secondary winding", one specific but non-limiting example of a "second secondary winding", and one specific but non-limiting example of a "third secondary winding", respectively, of one embodiment of the invention.

[Rectifying Smoothing Circuit 4]

The rectifying smoothing circuit 4 is provided between the secondary windings 312, 322, and 332 in the transformers 31, 32, and 33, and the output terminals T3 and T4. The rectifying smoothing circuit 4 may include six rectifying diodes 411, 412, 421, 422, 431, and 432, one choke coil Lch, and one output smoothing capacitor Cout.

It is to be noted that the rectifying diodes 411, 412, 421, 422, 431, and 432 correspond to one specific but non-limiting example of "six rectifying devices" of one embodiment of the invention. The output smoothing capacitor Cout corresponds to one specific but non-limiting example of an "output capacitor" of one embodiment of the invention.

In the rectifying smoothing circuit 4, every two rectifying diodes may be provided in series to one another in a same orientation and form one of three arms. In one specific but non-limiting example, the rectifying diodes 411 and 412 may form a first arm, the rectifying diodes 421 and 422 may form a second arm, and the rectifying diodes 431 and 432 may form a third arm. In addition, the first to third arms may be provided in parallel to one another between the output terminals T3 and T4. In one specific but non-limiting example, a connection point (a connection point Px) between first ends of the first to third arms may be coupled to the output terminal T3 through the choke coil Lch and an output line LO, and a connection point between second ends of the first to third arms may be coupled to a ground line LG extended from the output terminal T4.

In the first arm, cathodes of the rectifying diodes 411 and 412 may be disposed on the first-end side of the first arm. Anodes of the rectifying diodes 411 and 412 may be disposed on the second-end side of the first arm. In one specific but non-limiting example, the cathode of the rectifying diode 411 may be coupled to the connection point Px, the anode of the rectifying diode 411 and the cathode of the rectifying diode 412 may be coupled together at the connection point P7, and the anode of the rectifying diode 412 may be coupled to the ground line LG.

Similarly, in the second arm, cathodes of the rectifying diodes 421 and 422 may be disposed on the first-end side of the second arm. Anodes of the rectifying diodes 421 and 422 may be disposed on the second-end side of the second arm. In one specific but non-limiting example, the cathode of the rectifying diode 421 may be coupled to the connection point Px, the anode of the rectifying diode 421 and the cathode of the rectifying diode 422 may be coupled together at the connection point P8, and the anode of the rectifying diode 422 may be coupled to the ground line LG.

Similarly, in the third arm, cathodes of the rectifying diodes 431 and 432 may be disposed on the first-end side of the third arm. Anodes of the rectifying diodes 431 and 432 may be disposed on the second-end side of the third arm. In one specific but non-limiting example, the cathode of the rectifying diode 431 may be coupled to the connection point Px, the anode of the rectifying diode 431 and the cathode of the rectifying diode 432 may be coupled together at the connection point P9, and the anode of the rectifying diode 432 may be coupled to the ground line LG.

Moreover, the secondary windings 312, 322, and 332 in the respective transformers 31, 32, and 33 may be coupled between adjacent ones of the first to third arms to form an H-bridge coupling. In one specific but non-limiting example, the secondary winding 312 of the transformer 31 may be coupled between the first arm and the second arm adjacent to one another to form the H-bridge coupling. In addition, in this example, the secondary winding 322 of the transformer 32 and the secondary winding 332 of the transformer 33 may be coupled between the second arm and the third arm adjacent to one another to form the H-bridge coupling. In one more specific but non-limiting example, the secondary winding 312 may be inserted between the connection point P7 on the first arm and the connection point P8 on the second arm, while the secondary windings 322 and 332 may be inserted between the connection point P8 on the second arm and the connection point P9 on the third arm. In addition, in this example, between the second arm and the third arm, the secondary winding 322 may be disposed on the second arm side (the connection point P8 side) and the secondary winding 332 may be disposed on the third arm side (the connection point P9 side).

Between the first to third arms and the output smoothing capacitor Cout, the choke coil Lch may be disposed. In one specific but non-limiting example, the choke coil Lch may be inserted between the connection point (the connection point Px) of the first ends in the first to third arms and a first end of the output smoothing capacitor Cout, through the output line LO. In addition, the connection point between the second ends in the first to third arms may be coupled to a second end of the output smoothing capacitor Cout, on the ground line LG.

In the rectifying smoothing circuit 4 as configured above, in a rectifying circuit including the six rectifying diodes 411, 412, 421, 422, 431, and 432, the alternating-current voltages outputted from the transformers 31, 32, and 33 may be rectified, and the voltages thus rectified may be outputted. Moreover, in a smoothing circuit constituted by the choke coil Lch and the output smoothing capacitor Cout, the voltages rectified by the rectifying circuit may be smoothed to generate a direct-current output voltage Vout. It is to be noted that the direct-current output voltage Vout thus generated may be outputted from the output terminals T3 and T4 to the second battery (not illustrated) for electric power supply.

[Driving Circuit 5]

The driving circuit 5 may be a circuit that performs a switching drive to control operation of the switching devices S1 to S4 inside the switching circuit 2 (the half-bridge circuits 21 and 22, and the full-bridge circuit 23). In one specific but non-limiting example, the driving circuit 5 may supply the switching devices S1 to A4 with the respective drive signals SG1 to SG4, thereby control each of the switching devices S1 to S4 to be turned on and off.

Here, in the example embodiment, the driving circuit 5 may perform the switching drive to cause the two half-bridge circuits 21 and 22 to operate with a phase difference (a phase difference φ to be described later), and to cause phase control of the full-bridge circuit 23 to be performed. In other words, the driving circuit 5 may perform a switching phase control on the switching devices S1 to S4, and may set the phase difference appropriately to stabilize the direct-current output voltage Vout. Moreover, at this occasion, for example, the driving circuit 5 may perform the switching drive, although details of which is to be given later, to cause durations of on-duty periods of the switching devices S1 to S4 to be substantially maximum (or to be maximum in a preferred but non-limiting example), in the two half-bridge circuits 21 and 22. It is to be noted that the driving circuit 5 corresponds to one specific but non-limiting example of a "driver" of one embodiment of the invention.

[Operation, Workings, and Effects]
[A. Overall Operation]

In the switching power supply unit 1, in the switching circuit 2 (the half-bridge circuits 21 and 22, and the full-bridge circuit 23), the direct-current input voltage Vin supplied from the input terminals T1 and T2 may be switched to generate the alternating-current voltages. The alternating-current voltages may be supplied to the primary windings 311, 321, and 331 in the transformers 31, 32, and 33. In the transformers 31, 32, and 33, the alternating-current voltages may be converted. The alternating-current voltages thus converted may be outputted from the secondary windings 312, 322, and 332.

In the rectifying smoothing circuit 4, the alternating-current voltages outputted from the transformers 31, 32, and 33 (i.e., the voltage-converted alternating-current voltages) may be rectified by the rectifying diodes 411, 412, 421, 422, 431, and 432. Thereafter, the alternating-current voltages thus rectified may be smoothed by the choke coils Lch and the output smoothing capacitor Cout. Thus, the direct-current output voltage Vout may be outputted from the output terminals T3 and T4. The direct-current output voltage Vout may be supplied to the undepicted second battery to be used for charging of the second battery while driving the load 7.

[B. Detailed Operation]

Description is given next, with reference to FIGS. 3 to 7, on detailed operation of the switching power supply unit 1.

Figure 3:
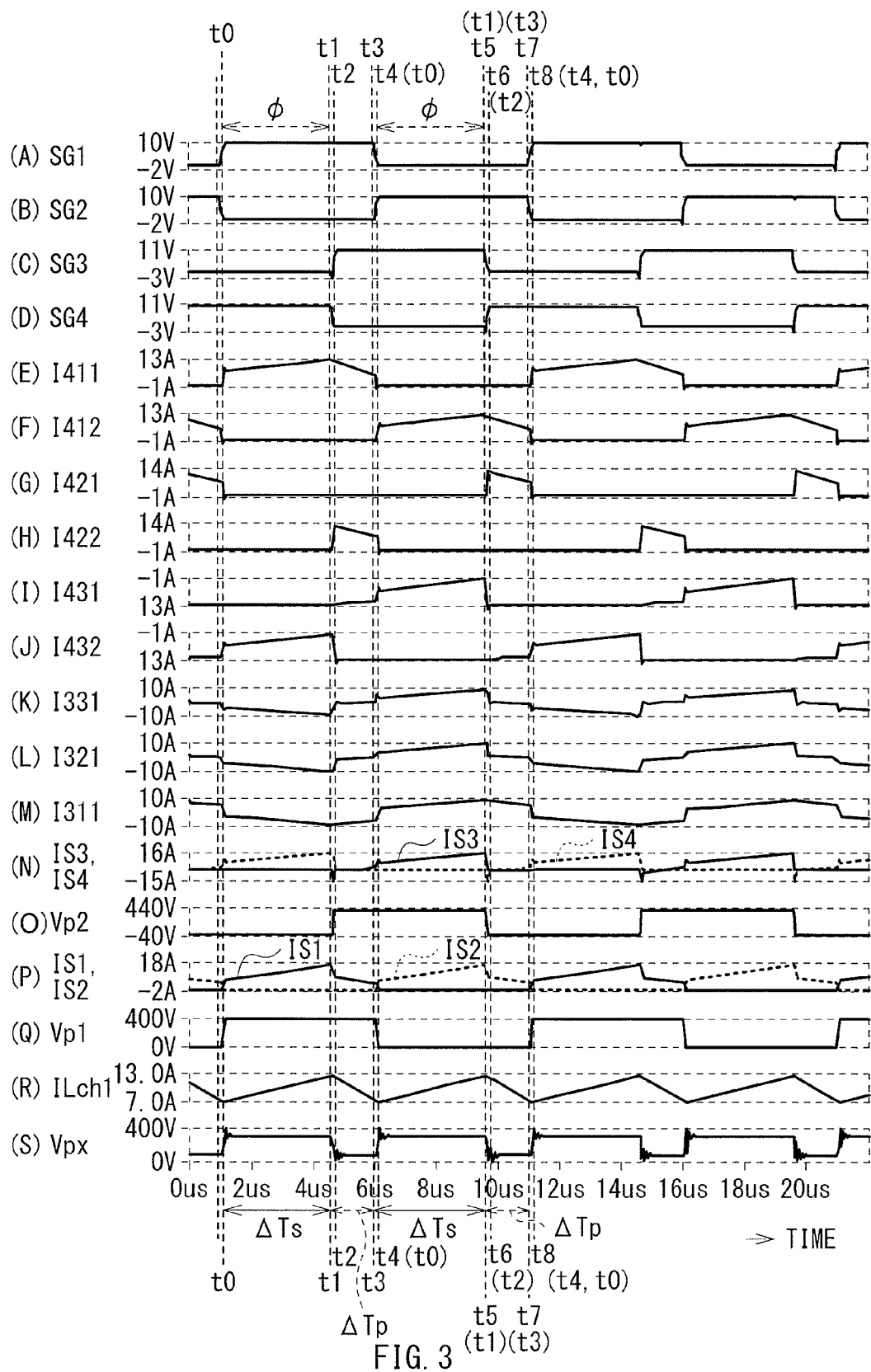
FIG. 3 is a timing waveform chart of an example of operation of the switching power supply unit illustrated in FIG. 1.

FIG. 3 illustrates, in a form of a timing waveform chart, a voltage waveform or a current waveform of each section in the switching power supply unit 1. Specifically, (A) to (D) of FIG. 3 illustrate voltage waveforms of the drive signals SG1 to SG4. (E) to (M) of FIG. 3 illustrate currents 1411, 1412, 1421, 1422, 1431, and 1432 flowing through the rectifying diodes 411, 412, 421, 422, 431, and 432, respectively, and current waveforms of currents 1331, 1321, and 1311 flowing through the primary windings 331, 321, and 311, respectively, as illustrated in FIG. 1. (N) of FIG. 3 illustrates currents IS3 and IS4 flowing through the switching devices S3 and S4, respectively, and (P) of FIG. 3 illustrates currents IS1 and IS2 flowing through the switching devices S1 and S2, respectively, as illustrated in FIG. 1. (O) and (Q) of FIG. 3 illustrate voltage waveforms of voltages Vp2 and Vp1 indicating a potential at the connection point P2 and a potential at the connection point P1, respectively, as illustrated in FIG. 1. (R) of FIG. 3 illustrates a current waveform of a current ILch flowing through the choke coil Lch, as illustrated in FIG. 1. (S) of FIG. 3 illustrates a voltage waveform of a voltage VPx applied to between the connection point Px and the ground line LG, as illustrated in FIG. 1. It is to be noted that positive directions of the voltages and the currents are denoted by arrows in FIG. 1.

FIGS. 4 to 7 each schematically illustrate, in a form of a circuit diagram, an operation state of the switching power supply unit 1 at each of timings (timings t0 to t4) illustrated in FIG. 3. It is to be noted that in the operation as illustrated in FIG. 3, operation for the timings t0 to t4 (a first half cycle) and operation for the timings t4 to t8 (a latter half cycle) may be combined to form one-cycle operation.

[B-1. Operation for First Half Cycle]

Description is given first, with reference to FIGS. 3 to 7, on the operation for the first half cycle (the timings t0 to t4).

As to the drive signals SG1 to SG4 of the switching devices S1 to S4 ((A) to (D) of FIG. 3), the switching devices S1 to S4 may be classified into two pairs of switching devices. In one specific but non-limiting example, the switching devices S1 and S2 may each be controlled to be turned on at a fixed timing on a time axis, and referred to as a "phase-locked-side switching device". In addition, the switching devices S3 and S4 may each be controlled to be turned on at a variable timing on the time axis, and referred to as a "phase-shift-side switching device".

In addition, the switching devices S1 to S4 may be driven, in any state of switching operation, in a combination and at a timing where the input terminals T1 and T2 to which the direct-current input voltage Vin is applied are not electrically shortcircuited. In one specific but non-limiting example, the switching devices S3 and S4 (the phase-shift-side switching devices) are not turned on together, and the switching devices S1 and S2 (the phase-locked-side switching devices) are not turned on together as well. A time interval taken to prevent them from being turned on together may be referred to as "dead time". The two half-bridge circuits 21 and 22 (that is, the switching devices S1 and S2, and the switching devices S3 and S4) may operate with the phase difference φ, for example, as illustrated in FIG. 3. In other words, the driving circuit 5 performs the switching phase control on the switching devices S1 to S4.

[Timings t0 to t1]

First, in a period before the timing t0, the switching devices S2 and S4 may be turned on, while the switching devices S1 and S3 may be turned off ((A) to (D) of FIG. 3). Next, in a period from the timing t0 to the timing t1, first, at the timing immediately before the timing t0, the switching device S2 may be turned off ((B) of FIG. 3), and the switching device S1 may be turned on ((A) of FIG. 3).

Figure 4:
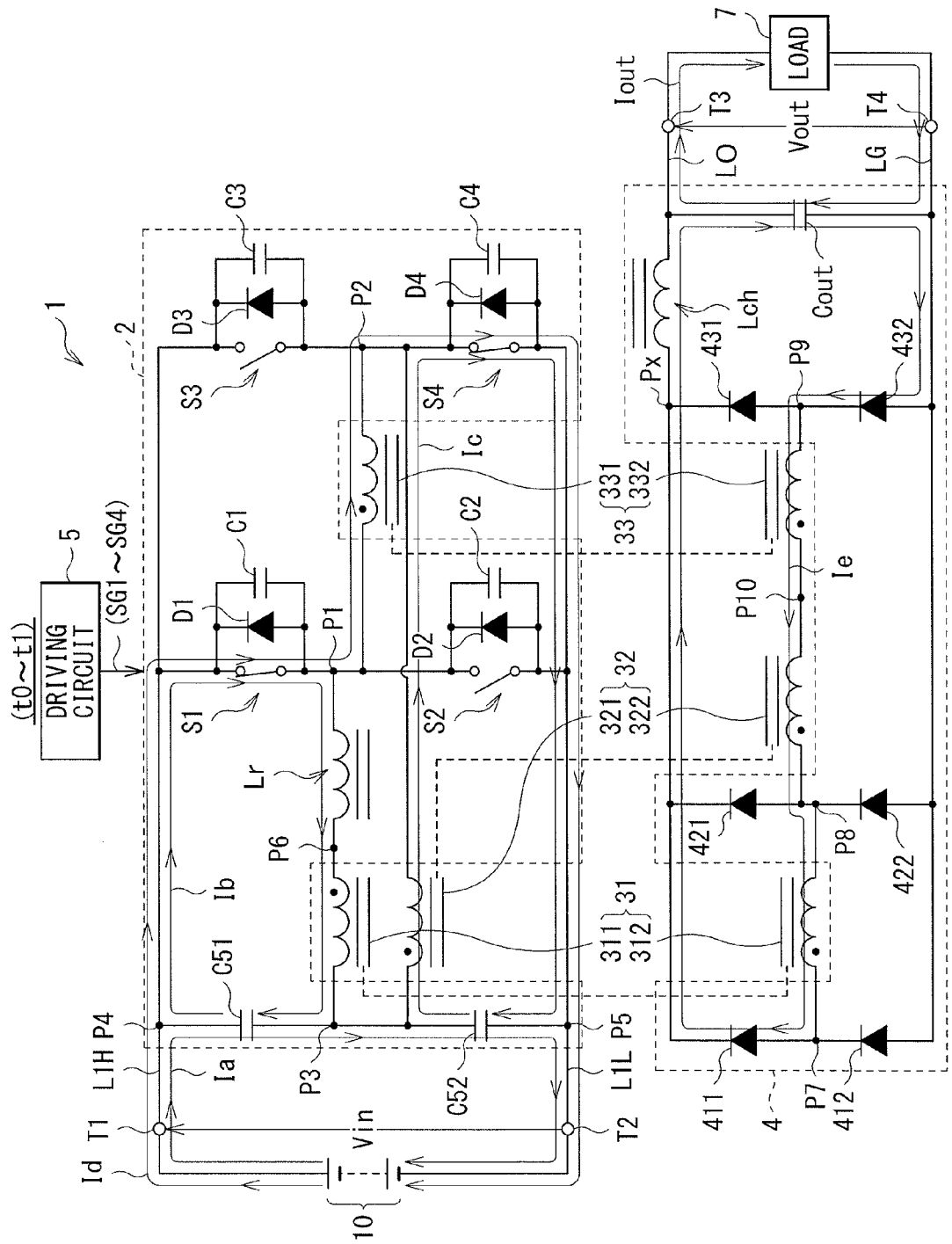
FIG. 4 is a circuit diagram of an example of an operation state of the switching power supply unit illustrated in FIG. 1.

In other words, in the period from the timing t0 to the timing t1, the switching devices S1 and S4 may be turned on, and the switching devices S2 and S3 may be turned off, as illustrated in FIG. 4. Therefore, on primary side (the switching circuit 2) of the transformers 31, 32, and 33, loop currents Ia, Ib, Ic, and Id may flow ((K) to (Q) of FIG. 3). In one specific but non-limiting example, the loop current Ia may flow to circulate through the battery 10, the input terminal T1, the capacitor C51, the capacitor C52, the input terminal T2, and the battery 10 in the order named. The loop current Ib may flow to circulate through the primary winding 311, the capacitor C51, the switching device S1, the resonance inductor Lr, and the primary winding 311 in the order named. The loop current Ic may flow to circulate through the primary winding 321, the switching device S4, the capacitor C52, and the primary winding 321 in the order named. The loop current Id may flow to circulate through the battery 10, the input terminal T1, the switching device S1, the primary winding 331, the switching device S4, the input terminal T2, and the battery 10 in the order named.

As described, in each of the primary windings 311, 321, and 331 of the transformers 31, 32, and 33, excitation is caused so that a winding-start side thereof is in the positive direction, as illustrated in FIG. 4. For this reason, in each of the secondary windings 312, 322, and 332 of the transformers 31, 32, and 33 as well, a voltage is outputted so that the winding-start side thereof is in the positive direction.

Therefore, in the period from the timing t0 to the timing t1, on secondary side (the rectifying smoothing circuit 4) of the transformers 31, 32, and 33, a loop current Ie and an output current Tout may flow ((E) to (J), (R), and (S) of FIG. 3). The loop current Ie may flow to circulate through the secondary winding 312, the rectifying diode 411, the choke coil Lch, the output smoothing capacitor Cout, the rectifying diode 432, the secondary winding 332, the secondary winding 322, and the secondary winding 312 in the order named.

In other words, at this occasion, the rectifying diodes 411 and 432 may each become conductive. In addition, at this occasion, the choke coil Lch may be excited by a potential difference (V312+V322+V332−Vout) between the sum of the output voltages V312, V322, and V332 from the transformers 31, 32, and 33, and the direct-current output voltage Vout. On the other hand, the output current Iout may flow to circulate through the output smoothing capacitor Cout, the output terminal T3, the load 7, the output terminal T4, and the output smoothing capacitor Cout in the order named, thereby allowing the load 7 to be driven.

As described, the period from the timing t0 to the timing t1 may serve as a power transmission period from the primary side to the secondary side of the transformers 31, 32, and 33, by a "three serial connection state" (a serial connection mode). In other words, in the period from the timing t0 to the timing t1, the three secondary windings 312, 322, and 332 may be in a state where the secondary windings 312, 322, and 332 are coupled in series to one another (the three serial connection state). In other words, the period from the timing t0 to the timing t1 may be a serial connection state period ΔTs in the secondary windings 312, 322, and 332, as illustrated in FIG. 3.

[Timings t1 to t2]

Next, in a period from the timing t1 to the timing t2, first, the switching device S4 may be turned off at the timing t1 ((D) of FIG. 3).

Figure 5:
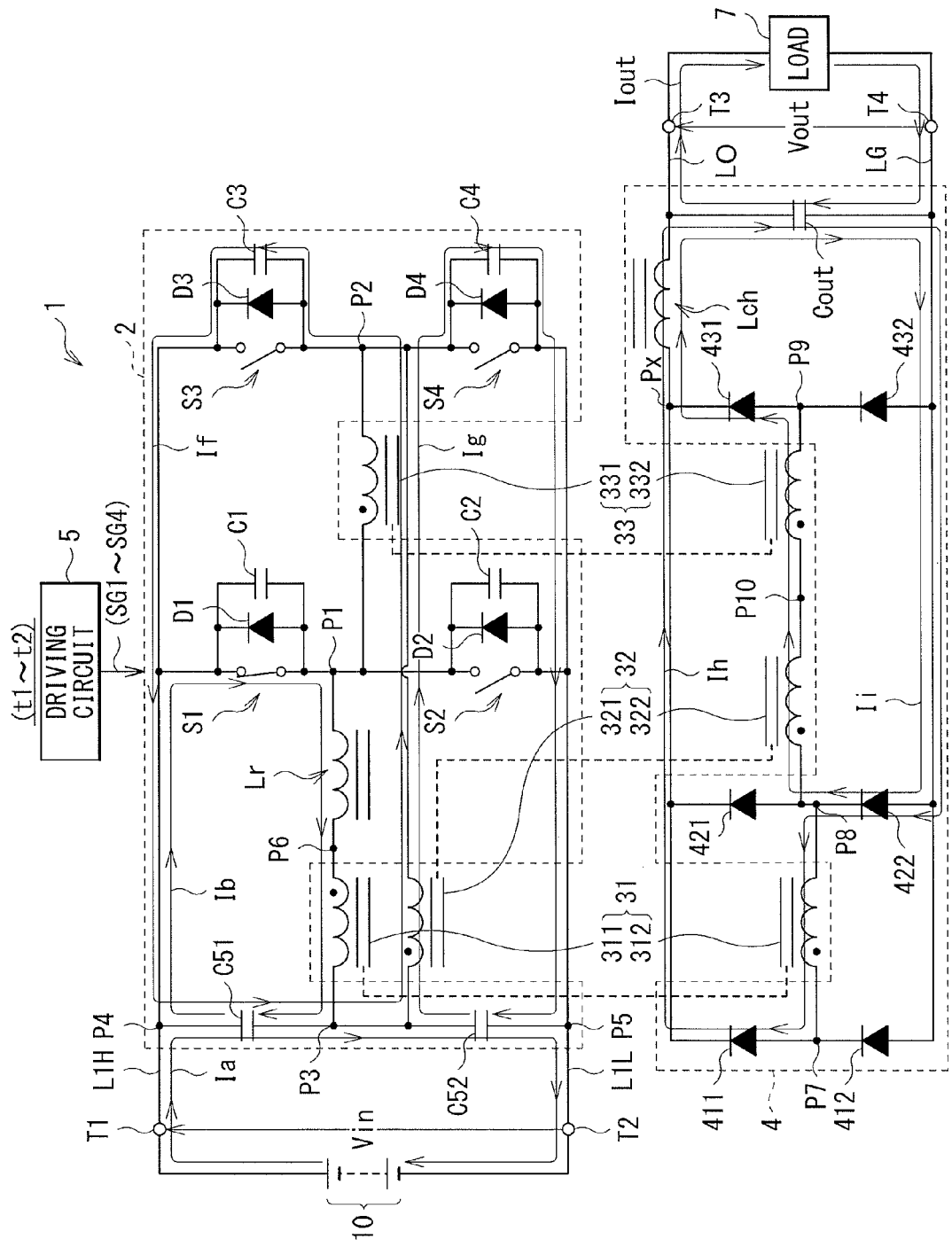
FIG. 5 is a circuit diagram of an example of an operation state following FIG. 4.

Then, as illustrated in FIG. 5, on the primary side of the transformers 31, 32, and 33, loop currents If and Ig may flow, together with the currents Ia and Ib ((K) to (Q) of FIG. 3). In one specific but non-limiting example, the loop current If may flow to circulate through the primary winding 321, the capacitor C3, the capacitor C51, and the primary winding 321 in the order named. The loop current Ig may flow to circulate through the primary winding 321, the capacitor C4, the capacitor C52, and the primary winding 321 in the order named.

The loop currents If and Ig (that correspond to "circulating currents" to be described later) may flow owing to energy stored in leakage inductance (not illustrated) of the transformer 32, and may flow so as to maintain a preceding current direction. In other words, the leakage inductance of the transformer 32 may work together with the capacitors C3, C4, C51, and C52 to constitute an LC resonance circuit whose LC resonance operation may cause such flows of the loop currents If and Ig. The loop currents If and Ig may allow the capacitor C3 to be discharged and the capacitor C4 to be charged. Hence, the energy stored in the leakage inductance of the transformer 32 is regenerated into the capacitor C51 on the primary side.

Next, the diode D3 serving as a body diode of the switching device S3 may become conductive, upon completion of the discharge from the capacitor C3 and the charge to the capacitor C4. This causes a flow of a loop current that flows through the diode D3 instead of flowing through the switching device S3, thereby allowing regeneration into the capacitor C51. In addition, at this occasion, in the primary winding 321 of the transformer 32, a winding-end side thereof may be in the positive direction, and the primary winding 331 of the transformer 33 may be in a state where both ends thereof are shortcircuited (shorted) by the switching devices S1 and S3.

Subsequently, the switching device S3 may be turned on while the diode D3 is conductive as described ((C) of FIG. 3). This achieves ZVS (zero volt switching) operation, resulting in reduction in a loss (a switching loss) in the switching device S3.

Upon completion of the regeneration into the capacitor C51, the direction of the current flowing through the primary winding 321 of the transformer 32 may be reversed. Hence, in the primary winding 321, excitation begins to bring a winding-end side thereof to be in the positive direction.

In accordance with the current reverse on the primary side, the following may occur on the secondary side of the transformers 31, 32, and 33 ((E) to (J), (R), and (S) of FIG. 3). In accordance with reverse of the voltage applied to the primary winding 321 of the transformer 32, an output voltage V322 from the secondary winding 322 of the transformer 32 may also be reversed, and the output voltage V322 may be outputted so that a winding-end side of the secondary winding 322 may be in the position direction. In addition, both ends of the primary winding 331 of the transformer 33 become shorted as described above, which causes a voltage applied to the primary winding 331 to become 0 (zero) V, allowing an output voltage V332 from the secondary winding 332 of the transformer 33 to become 0 V as well.

Accordingly, on the secondary side of the transformers 31, 32, and 33, loop currents Ih and Ii may flow as illustrated in FIG. 5 instead of the loop current Ie as described above. The loop current Ih may flow to circulate through the secondary winding 312, the rectifying diode 411, the choke coil Lch, the output smoothing capacitor Cout, the rectifying diode 422, and the secondary winding 312 in the order named. In addition, the loop current Ii may flow to circulate through the secondary winding 322, the secondary winding 332, the rectifying diode 431, the choke coil Lch, the output smoothing capacitor Cout, the rectifying diode 422, and the secondary winding 322 in the order named. In other words, at this occasion, the rectifying diode 432 may become nonconductive, while the rectifying diodes 422 and 431 may become conductive. In addition, at this occasion, the choke coil Lch may be excited by a potential difference (V312−Vout) between an output voltage V312 from the transformer 31 and an output voltage Vout.

As described, the period from the timing t1 to the timing t2 may serve as a power transmission period from the primary side to the secondary side of the transformers 31, 32, and 33, in a "two parallel connection state" (a parallel connection mode). In other words, in the period from the timing t1 to the timing t2, the two secondary windings 312 and 322 may be in a state where the secondary windings 312 and 322 are coupled in parallel to one another (the two parallel connection state). In other words, the period from the timing t1 to the timing t2 may be a parallel connection state period ΔTp in the secondary windings 312, 322, and 332, as illustrated in FIG. 3. As described, a transition may occur from the serial connection state period ΔTs (the electric power transmission period in the serial connection mode: the timing t0 to the timing t1) described above to the parallel connection state period ΔTp (the electric power transmission period in the parallel connection mode) at or after the timing t1. It is to be noted that an occasion when the excitation begins to bring the winding-end side in the primary winding 321 of the transformer 32 to be in the positive direction as described above may correspond to the timing t2.

[Timings t2 to t3]

Figure 6:
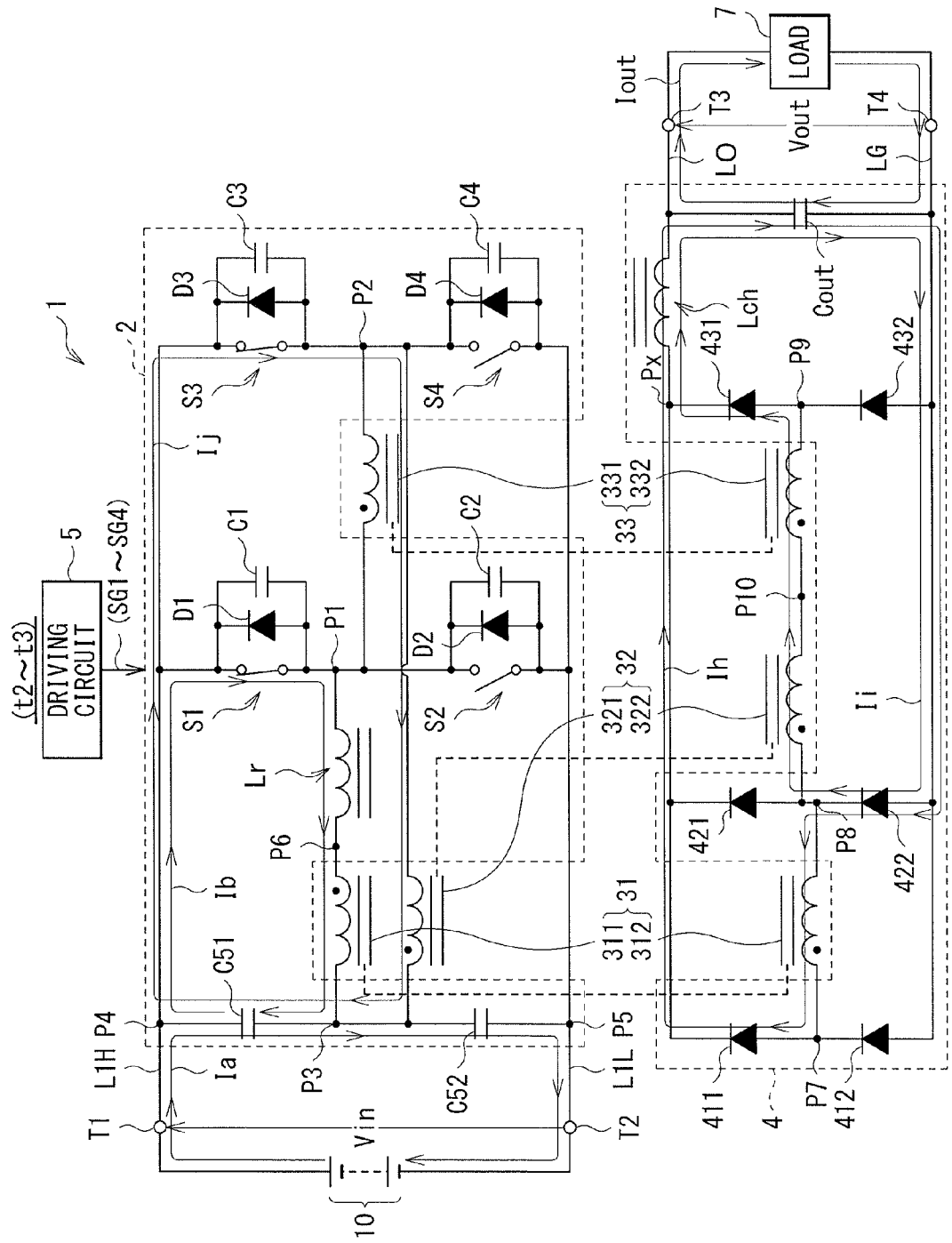
FIG. 6 is a circuit diagram of an example of an operation state following FIG. 5.

Next, as illustrated in FIG. 6, in a period from the timing t2 to the timing t3, the switching devices S1 and S3 may be turned on, and the switching devices S2 and S4 may be turned off ((A) to (D) of FIG. 3). For this reason, in the period from the timing t2 to the timing t3, a loop current Ij may flow on the primary side of the transformers 31, 32, and 33, together with the loop currents Ia and Ib as described above ((K) to (Q) of FIG. 3). In one specific but non-limiting example, the loop current Ij may flow to circulate through the primary winding 321, the capacitor C51, the switching device S3, and the primary winding 321 in the order named.

As described, as illustrated in FIG. 6, excitation may be caused to bring a winding-start side thereof to be in the positive direction in the primary winding 311 of the transformer 31, whereas in the primary winding 321 of the transformer 32, excitation may be caused to bring a winding-end side thereof to be in the positive direction. In addition, as described above, both ends thereof become shorted in the primary winding 331 of the transformer 33, allowing the voltage applied to the primary winding 331 to become 0 (zero) V.

Therefore, in the secondary winding 312 of the transformer 31 as well, a voltage may be outputted to bring a winding-start side thereof to be in the positive direction, whereas in the secondary winding 322 of the transformer 32 as well, a voltage may be outputted to bring a winding-end side thereof to be in the positive direction. The output voltage V322 from the secondary winding 332 of the transformer 33 may also become 0 V.

Hence, in the period from the timing t2 to the timing t3, the loop currents Ih and Ii as well as the output current Iout may flow in the transformers 31, 32, and 33 on the secondary side (the rectifying smoothing circuit 4) ((E) to (J), (R), and (S) of FIG. 3).

Here, as illustrated in FIG. 3, as with the period from the timing t1 to the timing t2, the period from the timing t2 to the timing 3 may be the parallel connection state period ΔTp (the electric power transmission period in the parallel connection mode). Therefore, as illustrated in FIG. 6, the current flowing through the choke coil Lch is split into the secondary winding 312 side (the loop current Ih) and the secondary windings 322 and 332 side (the loop current Ii). In addition, the choke coil (the resonance inductor Lr) coupled in series to the primary winding 311 of the transformer 31 may function as a current source, and therefore may tend to maintain drifting the flowing current.

Therefore, in the period from the timing t2 to the timing t3, magnitude of the loop current Ih flowing through the secondary winding 312 may change as follows. First, the loop current Ih takes an initial value equal to the current flowing through the choke coil Lch, and then proportion of the loop current Ih gradually decreases, by a gradual increase in proportion of the loop current Ii flowing through the secondary winding 322.

[Timings t3 to t4]

Next, in a period from the timing t3 to the timing t4, first, the switching device S1 may be turned off at the timing t3 ((A) of FIG. 3).

Figure 7:
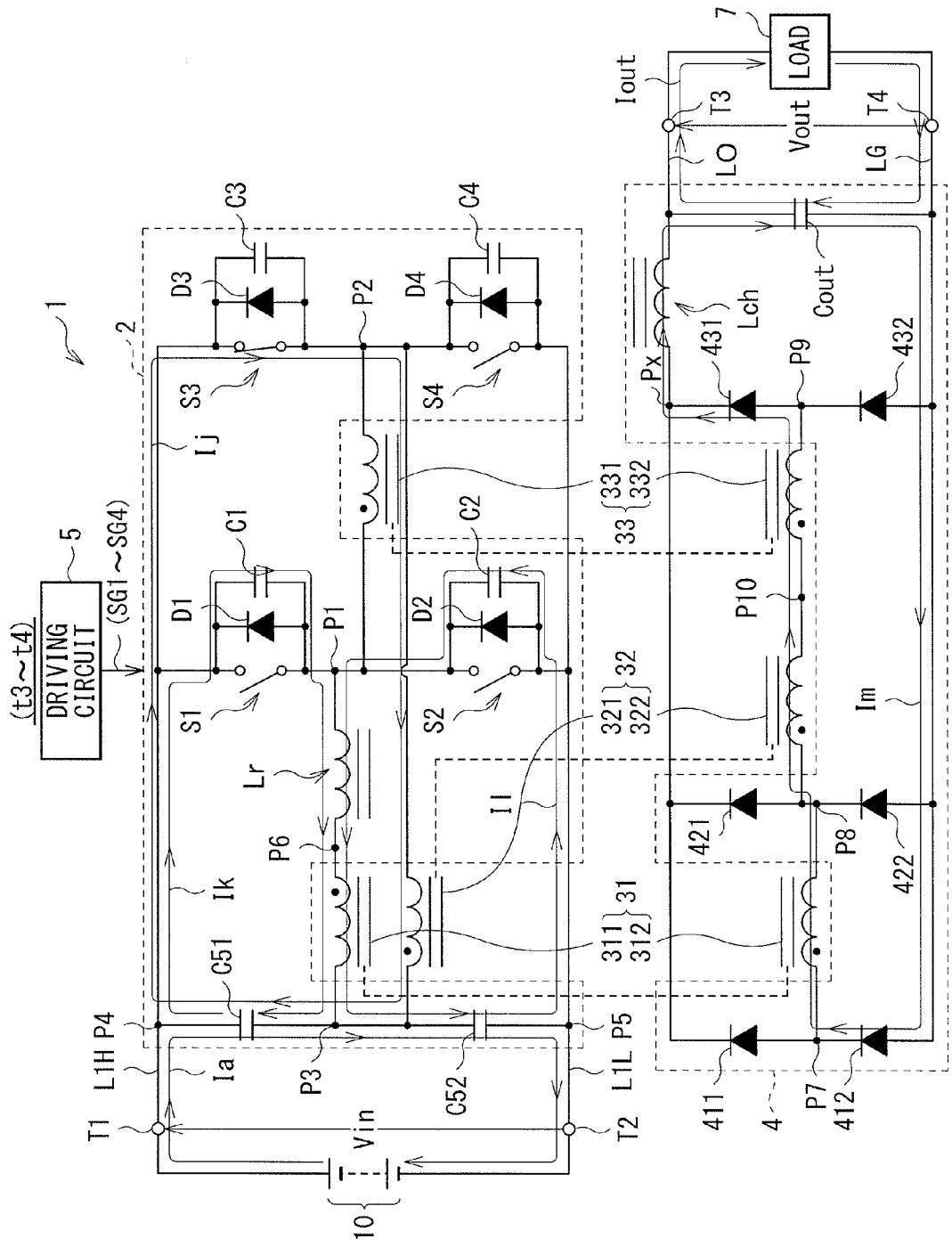
FIG. 7 is a circuit diagram of an example of an operation state following FIG. 6.

Then, as illustrated in FIG. 7, on the primary side of the transformers 31, 32, and 33, loop currents Ik and Il may flow, together with the loop currents Ia and Ij ((K) to (Q) of FIG. 3). In one specific but non-limiting example, the loop current Ik may flow to circulate through the primary winding 311, the capacitor C51, the capacitor C1, the resonance inductor Lr, and the primary winding 311 in the order named. The loop current Il may flow to circulate through the primary winding 311, the capacitor C52, the capacitor C2, the resonance inductor Lr, and the primary winding 311 in the order named.

The loop currents Ik and Il (that correspond to "circulating currents" to be described later) may flow owing to energy stored in the resonance inductor Lr and leakage inductance (not illustrated) of the transformer 31, and may flow so as to maintain a preceding current direction. In other words, the resonance inductor Lr and the leakage inductance of the transformer 31 may work together with the capacitors C1, C2, C51, and C52 to constitute an LC resonance circuit whose LC resonance operation may cause such flows of the loop currents Ik and Il. The loop currents Ik and Il may allow the capacitor C2 to be discharged and the capacitor C1 to be charged. Hence, the energy stored in the resonance inductor Lr and the leakage inductance of the transformer 31 may be regenerated into the capacitor C52 on the primary side.

Next, the diode D2 serving as a body diode of the switching device S2 may become conductive, upon completion of the discharge from the capacitor C2 and the charge to the capacitor C1. This causes a flow of a loop current that flows through the diode D2 instead of flowing through the switching device S2, thereby allowing regeneration into the capacitor C52. In addition, at this occasion, in each of the primary winding 311 and 331 of the transformers 31 and 33, a winding-end side thereof may be in the positive direction.

Subsequently, the switching device S2 may be turned on while the diode D2 is conductive as described ((B) of FIG. 3). This achieves the ZVS operation, resulting in reduction in a loss (a switching loss) in the switching device S2.

Upon completion of the regeneration into the capacitor C52, the direction of the current flowing through the primary winding 311 of the transformer 31 and the resonance inductor Lr may be reversed. Hence, in the primary winding 311, excitation begins to bring a winding-end side thereof to be in the positive direction. In the primary winding 331 of the transformer 33, a state transition may occur from the short state described above to a start of excitation in which the winding-end side is in the positive direction. It is to be noted that, in the primary winding 321 of the transformer 32, the excitation in which the winding-end side is the positive direction may continue.

Therefore, the following may occur on the secondary side of the transformers 31, 32, and 33 ((E) to (J), (R), and (S) of FIG. 3). In accordance with reverse of the voltage applied to the primary winding 311 of the transformer 31, an output voltage V312 from the secondary winding 312 of the transformer 31 may also be reversed, and the output voltage V312 may be outputted so that a winding-end side of the secondary winding 312 may be in the position direction. In addition, in accordance with the start of the excitation in the positive direction in the primary winding 331 of the transformer 33, the output voltage V332 may be outputted in the secondary winding 332 of the transformer 33 so that a winding-end side thereof may be in the positive direction. It is to be noted that, in the primary winding 321 of the transformer 32, the output of the output voltage V322 which keeps the winding-end side in the positive direction may continue.

This may cause a flow of a loop current Im, instead of the loop currents Ih and Ii mentioned above, on the secondary side of the transformers 31, 32, and 33, as illustrated in FIG. 7. The loop current Im may flow to circulate through the secondary winding 312, the secondary winding 322, the secondary winding 332, the rectifying diode 431, the choke coil Lch, the output smoothing capacitor Cout, the rectifying diode 412, and the secondary winding 312 in the order named. In other words, at this occasion, the rectifying diodes 411 and 422 may each become nonconductive, while the rectifying diode 412 becomes conductive. In addition, the choke coil Lch may be excited by a potential difference (V312+V322+V332−Vout) between the sum of the output voltages V312, V322, and V332 from the transformers 31, 32, and 33, and the output voltage Vout.

As described, the period from the timing t3 to the timing t4 may serve as a power transmission period from the primary side to the secondary side of the transformers 31, 32, and 33, in a "three serial connection state" (a serial connection mode). In other words, in the period from the timing t3 to the timing t4, the three secondary windings 312, 322, and 332 may be in a state where the secondary windings 312, 322, and 332 are coupled in series to one another (the three serial connection state). In other words, the period from the timing t3 to the timing t4 may be the serial connection state period ΔTs in the secondary windings 312, 322, and 332, as illustrated in FIG. 3. As described, a transition may occur from the parallel connection state period ΔTp (the electric power transmission period in the parallel connection mode: the timing t1 to the timing t3) described above to the serial connection state period ΔTs (the electric power transmission period in the serial connection mode) at or after the timing t3. It is to be noted that an occasion when the excitation begins to bring the winding-end side in the primary winding 311 of the transformer 31 to be in the positive direction as described above may correspond to the timing t4. The operation for the first half cycle (from the timing t0 to the timing t4) may be then terminated.

[B-2. Operation for Latter Half Cycle]

Description is given next on the operation for the latter half cycle (the timings t4 to t8 (=t0)), after the timings t0 to t4 as illustrated in FIG. 3.

The operation for the latter half cycle may be basically similar to the operation for the first half cycle (the timings t0 to t4) described with reference to FIGS. 4 to 7. As represented in parentheses in FIG. 3, the states at the timings t0, t1, t2, t3, and t4 may be equivalent to those at the timings t4, t5, t6, t7, and t8 (=t0), respectively (each may be equivalent to a state in which a phase is reversed by 180°). In the operation for the latter half cycle, the relation of the switching device S2 (the capacitor C2 and the diode D2) to the switching device S3 (the capacitor C3 and the diode D3) in the operation in the first half cycle may be replaced with the relation of the switching device S1 (the capacitor C1 and the diode D1) to the switching device S4 (the capacitor C4 and the diode D4).

Accordingly, description on details of the operation for the latter half cycle is omitted. Here ends the description on the series of operation illustrated in FIG. 3.

[C. Workings and Effects]

As described, the switching power supply unit 1 according to the example embodiment may have the circuit configuration as illustrated in FIGS. 1 and 2, and may perform the operation as illustrated in FIGS. 3 to 7. Hence, it is possible to obtain workings and effects as follows.

First, the driving circuit 5 may perform the switching drive to cause the two half-bridge circuits 21 and 22 to operate with the phase difference φ, and to cause the phase control of the full-bridge circuit 23 to be performed. The driving circuit 5 may control magnitude of the output voltage Vout, by performing the switching drive to switch the connection state of each of the three secondary windings 312, 322, and 332 included in the three transformers 31, 32, and 33 (to switch at a predetermined time ratio).

Here, such controlling of the output voltage Vout by switching the connection state is specifically described with reference to circuit diagrams and schematic diagrams illustrated in (A) and (B) of FIG. 8 as well as (A) and (B) of FIG. 9.

Figure 8:
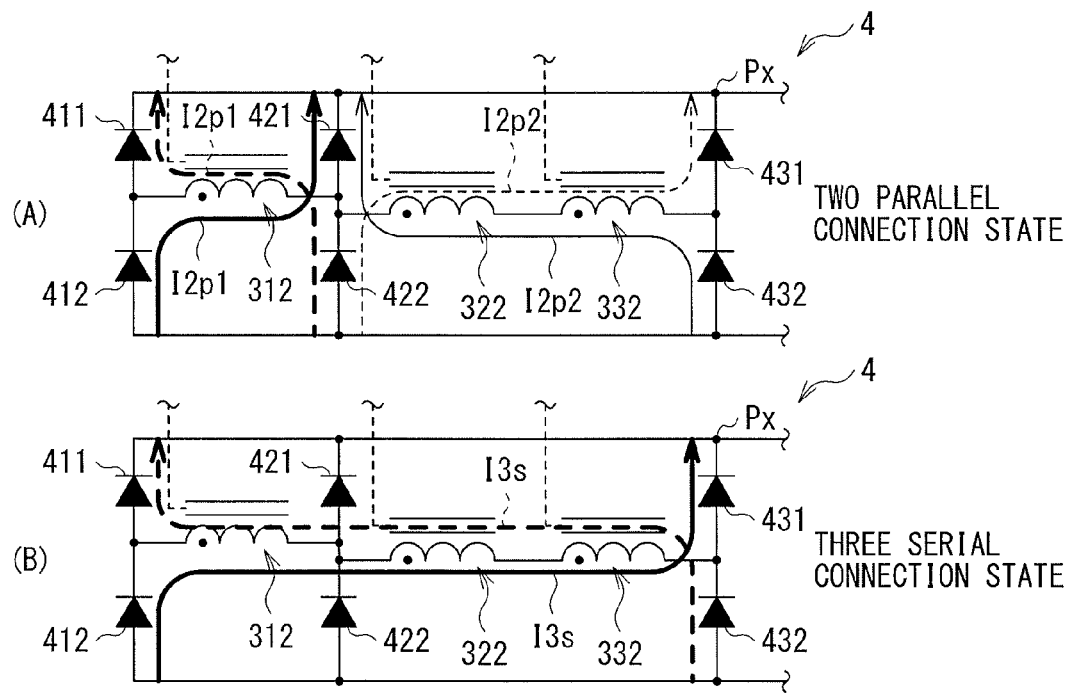
FIG. 8 is a circuit diagram for describing an example of an operation state in a rectifying smoothing circuit illustrated in FIG. 1.

In the example embodiment, the driving circuit 5 performs the switching drive for the switching circuit 2 (the half-bridge circuits 21 and 22, and the full-bridge circuit 23)

to switch the connection state of the secondary windings 312, 322, and 332 between the two parallel connection state ((A) of FIG. 8) and the three serial connection state ((B) of FIG. 8). In other words, the switching between the two parallel connection state and the three serial connection state is performed according to whether the three transformers 31, 32, and 33 are in phase or out of phase.

Here, in the two parallel connection state, currents I2p1 and I2p2 may flow in parallel to one another, in a direction indicated with a solid line or dashed line in a combination, in each of the secondary windings 312, 322, and 332, as illustrated in (A) of FIG. 8. In one specific but non-limiting example, referring to the configuration of the rectifying smoothing circuit 4 illustrated in FIG. 1, the current I2p1 indicated with the solid line may flow through the rectifying diode 412, the secondary winding 312, and the rectifying diode 421 in the order named. In addition, the current I2p1 indicated with the dashed line may flow through the rectifying diode 422, the secondary winding 312, and the rectifying diode 411 in the order named. Similarly, the current I2p2 indicated with the solid line may flow through the rectifying diode 432, the secondary winding 332, the secondary winding 322, and the rectifying diode 421 in the order named. In addition, the current I2p2 indicated with the dashed line may flow through the rectifying diode 422, the secondary winding 322, the secondary winding 332, and the rectifying diode 431 in the order named. It is to be noted that, among the currents I2p1 and I2p2 each indicated with the solid line or dashed line, one indicated with a bold line (the secondary winding 312 side) and one indicated with a thin line (the secondary windings 322 and 332 side) represent a current of a relatively large amount (the bold line) and a current of a relatively small amount (the thin line), respectively.

Figure 9:
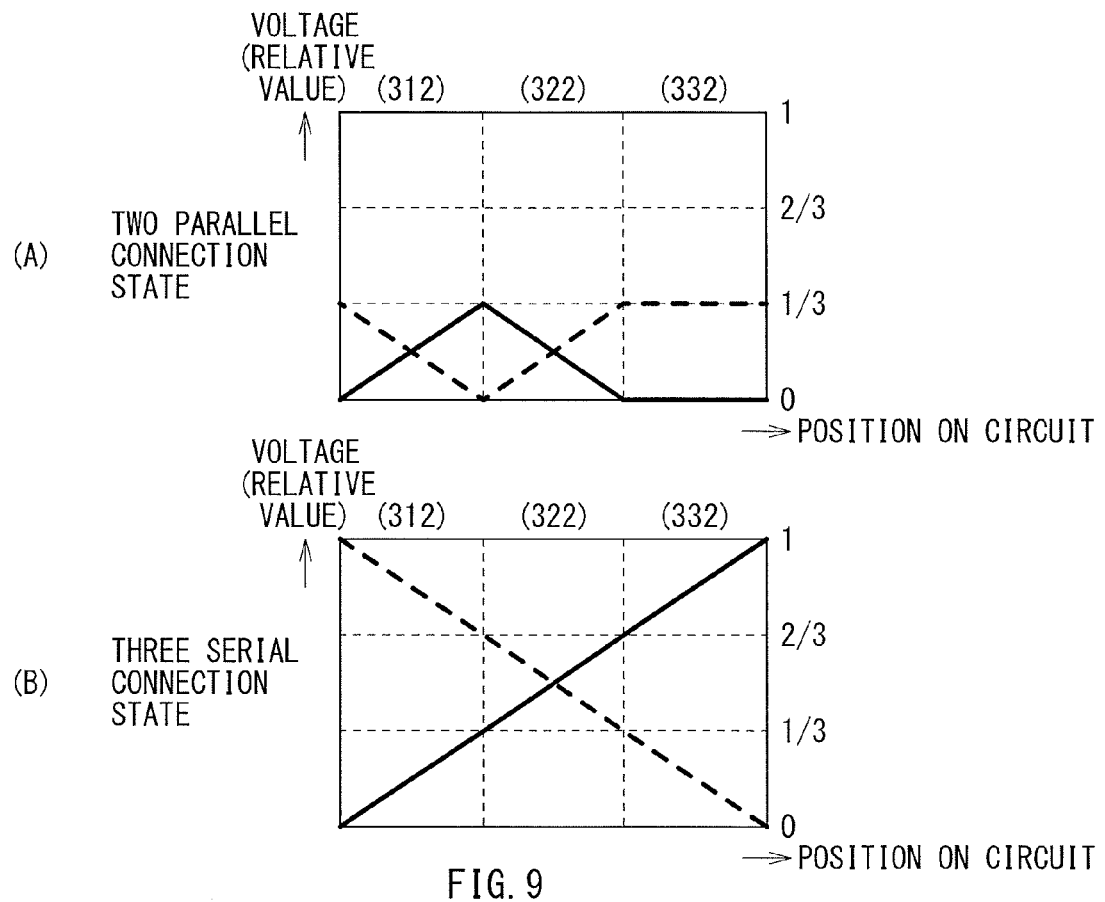
FIG. 9 is a schematic diagram of the example of the operation state illustrated in FIG. 8.

In the two parallel connection state, a position in the rectifying smoothing circuit 4 may correspond to magnitude of a voltage, as schematically illustrated in (A) of FIG. 9, for example. It is to be noted that a graph indicated with a solid line and a graph indicated with a dashed line in (A) of FIG. 9 correspond to magnitude (a relative value) of a voltage in a flow of the current I2p1 indicated with the solid line and magnitude of a voltage in a flow of the current I2p2 indicated with the dashed line illustrated in (A) of FIG. 8, respectively. In the two parallel connection state, the voltage linearly changes due to the currents I2p1 and I2p2 in such a manner that a mountain shape or valley shape is formed in a part corresponding to the secondary windings 312 and 322. In addition, in a part corresponding to the secondary winding 332, a voltage between the both ends is 0 V due to the short state described above.

On the other hand, in the three serial connection state, a current I3s may serially flow in a direction indicated with a solid line or dashed line in a combination, in each of the secondary windings 312, 322, and 332, as illustrated in (B) of FIG. 8. In one specific but non-limiting example, referring to the configuration of the rectifying smoothing circuit 4 illustrated in FIG. 1, the current I3s indicated with the solid line may flow through the rectifying diode 412, the secondary winding 312, the secondary winding 322, the secondary winding 332, and the rectifying diode 431 in the order named. In addition, the current I3s indicated with the dashed line may flow through the rectifying diode 432, the secondary winding 332, the secondary winding 322, the secondary winding 312, and the rectifying diode 411 in the order named.

In the three serial connection state, a position in the rectifying smoothing circuit 4 may correspond to magnitude of a voltage, as schematically illustrated in (B) of FIG. 9, for example. It is to be noted that a graph indicated with a solid line and a graph indicated with a dashed line in (B) of FIG. 9 correspond to magnitude (a relative value) of a voltage in a flow of the current I3s indicated with the solid line and magnitude of a voltage in a flow of the current I3s indicated with the dashed line illustrated in (B) of FIG. 8, respectively. In the three serial connection state, the voltage linearly changes due to the current I3s, in a part corresponding to the secondary windings 312, 322, and 332, as a whole.

Here, as illustrated in FIGS. 2 and 3, the switching drive may be performed, with a phase difference of 180°, on the two switching devices S1 and S2 in the half-bridge circuit 21. The switching drive may be performed, with a phase difference of 180°, on the two switching devices S3 and S4 in the half-bridge circuit 22 as well. In addition, as described, the two half-bridge circuits 21 and 22 may be also driven to operate with the phase difference ϕ, for example, as illustrated in FIG. 3.

Controlling the phase difference ϕ, therefore, makes it possible to change a time ratio (duty) between the two parallel connection state and the three serial connection state as described. This allows for adjustment of the magnitude of the output voltage Vout. Specifically, increasing the phase difference ϕ may be equivalent to increasing a superposition period of the drive signals SG1 and SG4, and increasing a superposition period of the drive signals SG2 and SG3. In other words, increasing the phase difference ϕ may be equivalent to increasing the serial connection state period ΔTs illustrated in FIG. 3.

Moreover, in the example embodiment, for example, the driving circuit 5 may perform the switching drive to cause durations of the on-duty periods of the switching devices S1 to S4 to be substantially maximum (or to be maximum in a preferred but non-limiting example), in the half-bridge circuits 21 and 22.

Here, as described above, in an off-duty period in which no power transmission by the transformers 31, 32, and 33 is performed, generation of a circulating current (e.g., the loop currents If, Ig, Ik, and Il) with use of the LC resonance operation may achieve the ZVS operation when the switching device is turned on. However, the circulating current necessary for the ZVS operation exists in the off-duty period. This may increase a loss in electrical power as the off-duty period becomes longer, resulting in a reduction in power conversion efficiency.

In the example embodiment, as described, in the half-bridge circuits 21 and 22, the switching drive may be performed to cause durations of the on-duty periods of the switching devices S1 to S4 to be substantially a maximum. This allows the off-duty periods to be limited to a short time, i.e., the dead time as described above (e.g., the period from the timing t1 to the timing t2, the period from the timing t3 to the timing t4, the period from the timing t5 to the timing t6, and the period from the timing t7 to the timing t8). Hence, it is possible to minimize generation of the circulating current necessary for the ZVS operation. Consequently, a power loss due to the circulating current flowing through the body diodes (the diodes D1 to D4) of the switching devices S1 to S4 may be also minimized, leading to enhancement in power conversion efficiency. It is to be noted that, in a preferred but non-limiting example, the durations of the on-duty periods of the switching devices S1 to S4 may be substantially maximum in order to reduce the power loss due to the circulating current; however, the operation is not hindered even when the durations of the on-duty periods are not substantially maximum.

Furthermore, in the example embodiment, it is possible to set any value for the turn ratio (=Np3/Ns3) of the number-of-winding-turns Np3 in the primary winding 331 and the number-of-winding-turns Ns3 in the secondary winding 332 in the transformer 33 as described. Therefore, a voltage range in the voltage conversion from the direct-current input voltage Vin to the direct-current output voltage Vout may change depending on magnitude of the turn ratio (Np3/Ns3).

Figure 10:
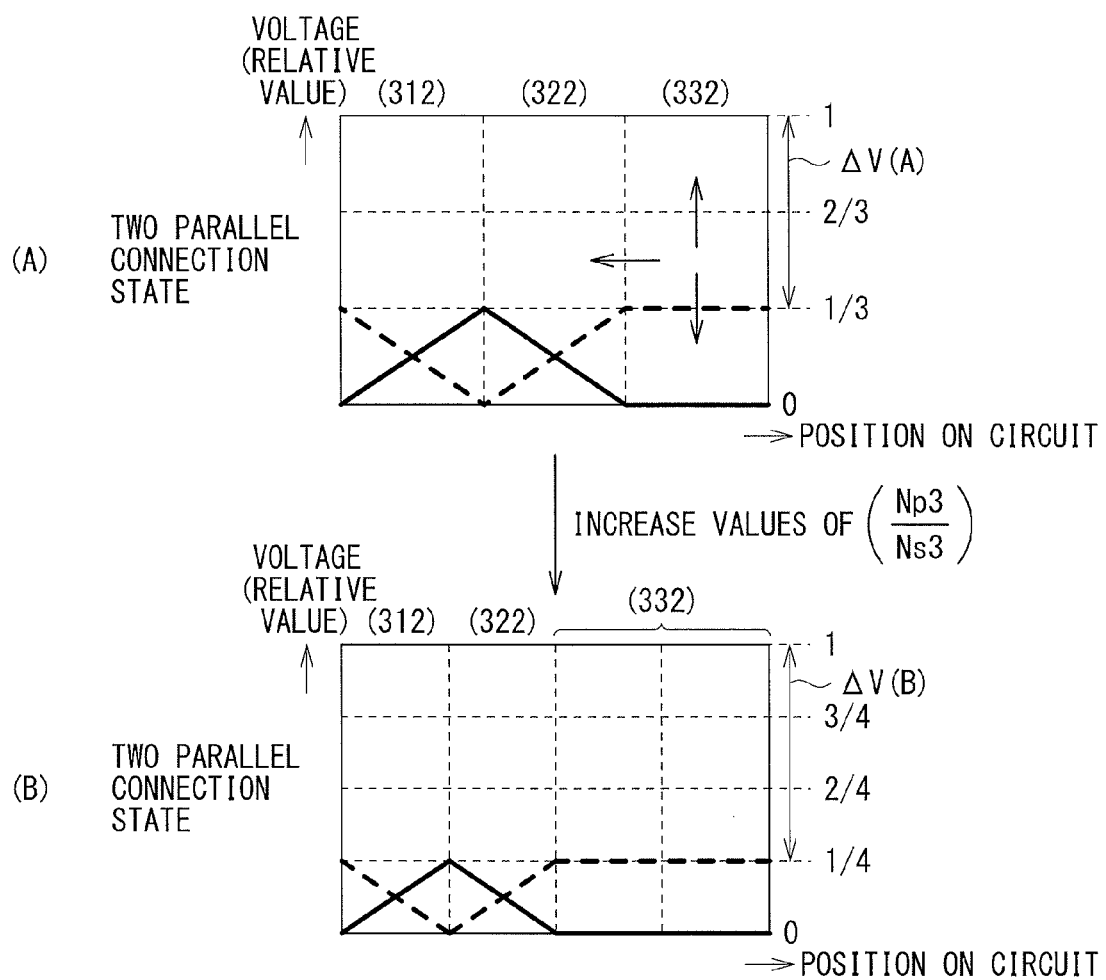
FIG. 10 is a schematic diagram for describing a modification example of the example of the operation state illustrated in FIG. 9.

Specifically, referring to schematic diagrams illustrated in (A) and (B) of FIG. 10, some examples may be as follows. First, in an example (corresponding to the example illustrated in (A) of FIG. 8) of the two parallel connection state illustrated in (A) of FIG. 10, the turn ratio (Np3/Ns3) in the transformer 33 is equal to a turn ratio (Np1/Ns1=Np2/Ns2) in the transformers 31 and 32. In contrast, in an example of the two parallel connection state illustrated in (B) of FIG. 10, the turn ratio (Np3/Ns3) in the transformer 33 is set to take a value that increases to achieve (Np3/Ns3): (Np1/Ns1), (Np2/Ns2)=2:1. Therefore, as indicated with an arrow in (A) of FIG. 10, influence of the secondary winding 332 increases to be relatively large as compared with the secondary windings 312 and 322 in the rectifying smoothing circuit 4. Hence, in the example in (B) of FIG. 10, a difference (a voltage difference) between magnitude (a relative value) of a voltage in the three serial connection state ((B) of FIG. 9) and magnitude of a voltage in the two parallel connection state is large, and the voltage range (an output voltage range or an input voltage range) in the voltage conversion is wide, as compared with the example in (A) of FIG. 10. To be more specific, the voltage difference (a voltage difference ΔV(B)) in the example in (B) of FIG. 10 is larger than the voltage difference (a voltage difference ΔV(A)) in the example in (A) of FIG. 10 (i.e., ΔV(B)>ΔV(A)). Therefore, in the example in (B) of FIG. 10, it is possible to widen the voltage range, as compared with the example in (A) of FIG. 10.

As described, in the example embodiment, the switching power supply unit 1 may have the circuit configuration as illustrated in FIGS. 1 and 2, and the operation as illustrated in FIGS. 3 to 7 may be performed. Hence, it is possible to minimize the generation of the circulating current necessary for the ZVS operation. This results in reduction in a conduction loss that does not contribute to power transmission in the switching devices S1 to S4, making it possible to facilitate enhancement in power transmission efficiency.

The reduction in the loss also makes it possible to use a device having a smaller rating, allowing for reduction in costs. Furthermore, the reduction in the loss causes reduction in heat generation in the switching devices S1 to S4. Hence, it is possible to relieve requests for performance of a heat dissipation insulating plate necessary to attain both heat dissipation and insulation. In this viewpoint as well, it is possible to reduce costs.

In addition, in the example embodiment, the output voltage from the transformers 31, 32, and 33 (e.g., corresponding to the voltage VPx illustrated in (S) of FIG. 3) has a stepwise waveform with two stages. Therefore, amplitude of ringing generated in each of the rectifying diodes 411, 412, 421, 422, 431, and 432 in the rectifying smoothing circuit 4 becomes small, as compared with a typical phase-shift full bridge converter. Since the ringing generated in each of the rectifying diodes thus becomes small, it is possible to use a lower withstand voltage device. The use of the lower withstand voltage device makes it possible to reduce costs and reduce a loss in each of the rectifying diodes as well.

In addition, the circuit configuration of the switching circuit 2 and the rectifying smoothing circuit 4 of the example embodiment may have, for example, the following advantages, as compared with a circuit configuration in which three half-bridge circuits are disposed in parallel in a switching circuit and eight rectifying diodes are provided in a rectifying smoothing circuit (four arms are disposed in parallel) (i.e., a so-called "triple half-bridge circuit"). In the switching circuit 2 and the rectifying smoothing circuit 4 of the example embodiment, it is possible to ensure the voltage range (the voltage range in the voltage conversion from the direct-current input voltage Vin to the direct-current output voltage Vout) equivalent to that in the "triple half-bridge circuit", by using fewer devices. Specifically, in the example embodiment, it is possible to achieve a voltage range equivalent to that in the "triple half-bridge circuit", while reducing the number of switching devices from six to four, and reducing the number of rectifying diodes from eight to six.

Moreover, the example embodiment has the following advantages, as compared with a circuit configuration in which two half-bridge circuits are disposed in parallel in a switching circuit and six rectifying diodes are provided in a rectifying smoothing circuit (three arms are disposed in parallel) (i.e., a so-called "double half-bridge circuit"). In other words, in the switching circuit 2 and the rectifying smoothing circuit 4 of the example embodiment, it is possible to widen the voltage range in the voltage conversion from the direct-current input voltage Vin to the direct-current output voltage Vout further, even though the number of devices (the four switching devices and the six rectifying diodes) is equal to that in the "triple half-bridge circuit".

Furthermore, in the example embodiment, since it is possible to set any value for the turn ratio (Np3/Ns3) in the transformer 33, it is possible to change the voltage range in the voltage conversion from the direct-current input voltage Vin to the direct-current output voltage Vout, depending on the magnitude of the turn ratio (Np3/Ns3). Therefore, it is possible to control (set) this voltage range on an as-needed basis, and to improve flexibility in product design, depending on, for example, an application of the switching power supply unit 1 or specifications of a product.

In addition, in the switching circuit 2 of the example embodiment, the resonance inductor Lr coupled in series to the primary winding 311 may be provided between the connection point (the connection point P1) of the phase-locked-side switching devices (the switching devices S1 and S2) and the connection point (the connection point P3) of the capacitors C51 and C52, making it possible to obtain the following effects as well. For example, as compared with a case where the resonance inductor Lr is provided on the phase-shift-side switching devices (the switching devices S3 and S4) side, it is possible to reduce the circulating current further, and to facilitate further enhancement in power conversion efficiency.

2. Modification Examples

Description is given next on modification examples (modification examples 1 to 4) of the forgoing example embodiment. It is to be noted that, in the following modification examples, similar components to those of the example embodiment are denoted by similar references, and description thereof is omitted.

Modification Example 1

[A. Configuration]

Figure 11:
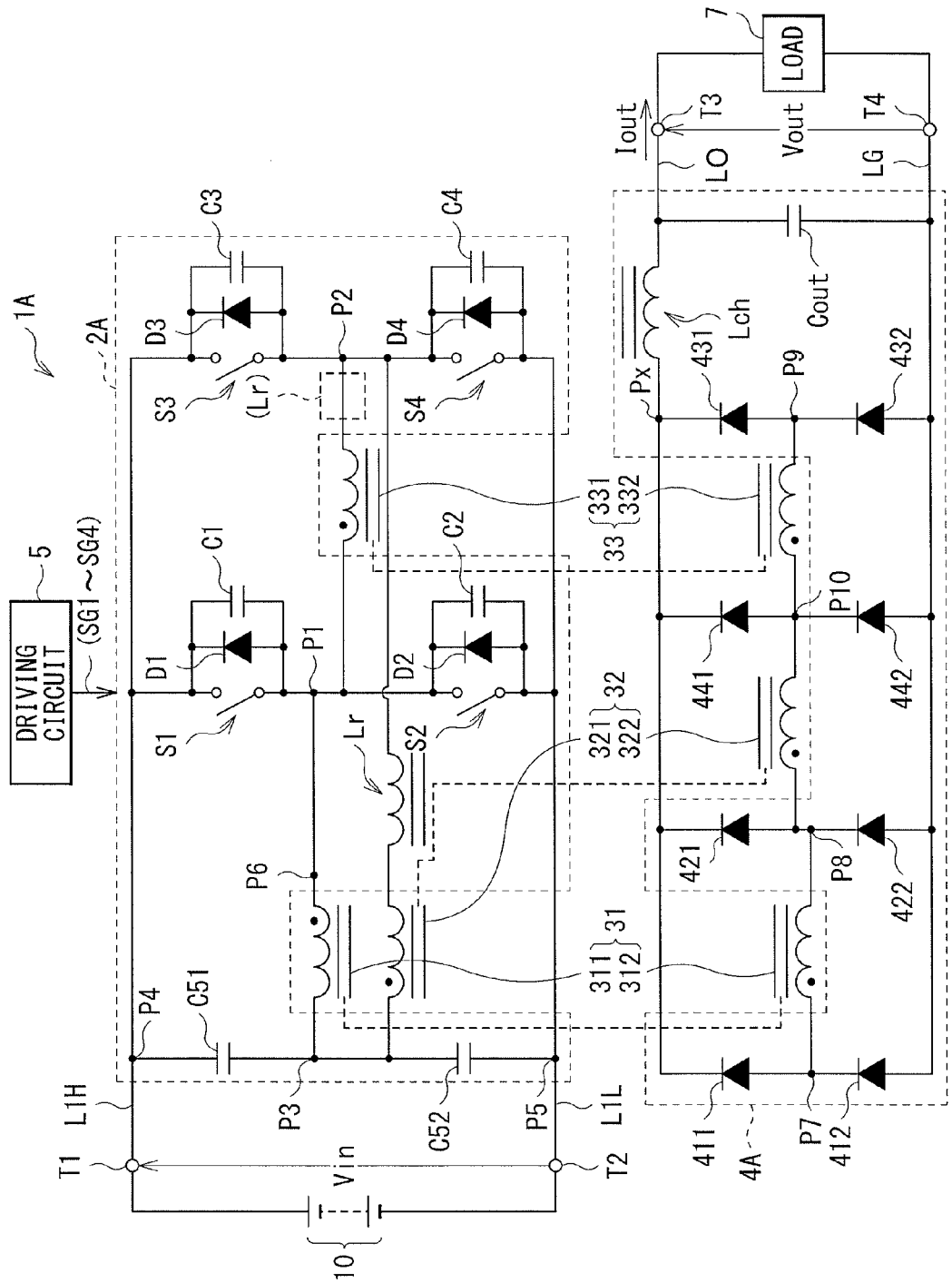
FIG. 11 is a circuit diagram of an example of an overall configuration of a switching power supply unit according to a modification example 1.

FIG. 11 illustrates, in a form of a circuit diagram, an example of an overall configuration of a switching power supply unit (a switching power supply unit 1A) according to a modification example 1.

The switching power supply unit 1A according to the present modification example may be provided with a switching circuit 2A and a rectifying smoothing circuit 4A, instead of the switching circuit 2 and the rectifying smoothing circuit 4 in the switching power supply unit 1 of the example embodiment, respectively. It is to be noted that other configurations such as the transformers 31 to 33 have similar configurations as those in the switching power supply unit 1.

The switching circuit 2A may have a configuration in which the position where the resonance inductor Lr is disposed is changed in the switching circuit 2. In one specific but non-limiting example, as illustrated in FIG. 11, the primary winding 321 and the resonance inductor Lr in a serially-coupled state may be inserted between the connection points P2 and P3 in the switching circuit 2A, unlike the switching circuit 2. In one specific but non-limiting example, the first end of the primary winding 321 may be coupled to the connection point P3, the second end of the primary winding 321 and the first end of the resonance inductor Lr may be coupled to one another, and the second end of the resonance inductor Lr may be coupled to the connection point P2. It is to be noted that, in the switching circuit 2A, for example, as schematically illustrated using a dashed line and parentheses in FIG. 11, the primary winding 331 and the resonance inductor Lr in a serially-coupled state may be inserted between the connection points P1 and P2, instead of between the connection points P2 and P3. In one specific but non-limiting example, the first end of the primary winding 331 may be coupled to the connection point P1, the second end of the primary winding 331 and the first end of the resonance inductor Lr may be coupled to one another, and the second end of the resonance inductor Lr may be coupled to the connection point P2.

The rectifying smoothing circuit 4A may have a configuration in which two rectifying diodes (one arm) are additionally provided in the rectifying smoothing circuit 4. In one specific but non-limiting example, as illustrated in FIG. 11, the rectifying smoothing circuit 4A may be configured in such a manner that a fourth arm having two rectifying diodes 441 and 442 disposed in series to one another is additionally disposed in parallel to the first to third arms in the rectifying smoothing circuit 4 illustrated in FIG. 1. In addition, the rectifying diodes 441 and 442 may be coupled together (coupled in series) at the connection point P10, which is a connection point between the secondary windings 322 and 332.

Here, the rectifying diodes 441 and 442 may be disposed in a same orientation as the orientation in which the six rectifying diodes 411, 412, 421, 422, 431, and 432 described so far are disposed. In other words, a cathode of the rectifying diode 441 may be coupled to the connection point Px, an anode of the rectifying diode 441 and a cathode of the rectifying diode 442 may be coupled together at the connection point P10, and an anode of the rectifying diode 442 may be coupled to the ground line LG.

It is to be noted that the rectifying diodes 441 and 442 correspond to one specific but non-limiting example of "two other rectifying devices" of one embodiment of the invention.

[B. Operation, Workings, and Effects]

The switching power supply unit 1A may basically operate in a manner similar to the switching power supply unit 1.

However, in the present modification example, the eight rectifying diodes may be provided in the rectifying smoothing circuit 4A (the two rectifying diodes may be additionally provided), as described. Therefore, in the present modification example, a three parallel connection state and a three serial connection state as described below may be provided instead of the two parallel connection state and the three serial connection state described above.

Figure 12:
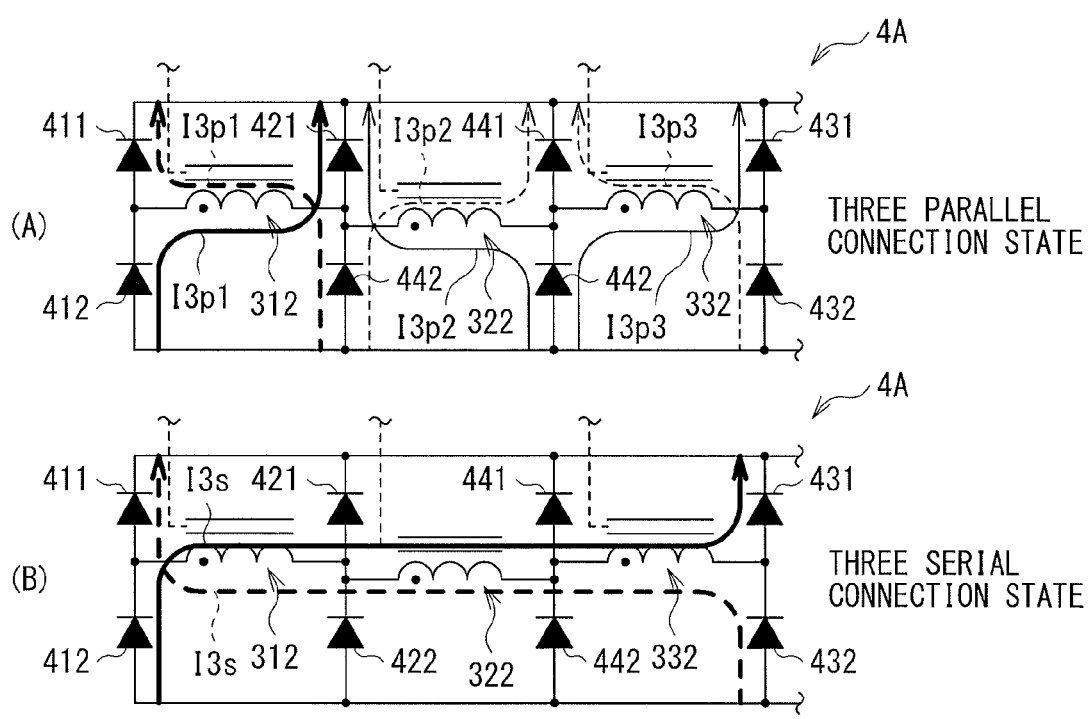
FIG. 12 is a circuit diagram for describing an example of an operation state in a rectifying smoothing circuit illustrated in FIG. 11.

In other words, first, in the three parallel connection state, currents I3p1, I3p2, and I3p3 may flow in parallel to one another, in a direction indicated with a solid line or dashed line in a combination, in each of the secondary windings 312, 322, and 332, as illustrated in (A) of FIG. 12. In one specific but non-limiting example, referring to the configuration of the rectifying smoothing circuit 4A illustrated in FIG. 11, the current I3p1 indicated with the solid line may flow through the rectifying diode 412, the secondary winding 312, and the rectifying diode 421 in the order named. In addition, the current I3p1 indicated with the dashed line may flow through the rectifying diode 422, the secondary winding 312, and the rectifying diode 411 in the order named. Similarly, the current I3p2 indicated with the solid line may flow through the rectifying diode 442, the secondary winding 322, and the rectifying diode 421 in the order named. Moreover, the current I3p2 indicated with the dashed line may flow through the rectifying diode 422, the secondary winding 322, and the rectifying diode 441 in the order named. The current I3p3 indicated with the solid line may flow through the rectifying diode 442, the secondary winding 332, and the rectifying diode 431 in the order named. In addition, the current I3p3 indicated with the dashed line may flow through the rectifying diode 432, the secondary winding 332, and the rectifying diode 441 in the order named. It is to be noted that, among the currents I3p1, I3p2, and I3p3 each indicated with the solid line or dashed line, one indicated with a bold line (the secondary winding 312 side) and one indicated with a thin line (the secondary windings 322 and 332 side) represent a current of a relatively large amount (the bold line) and a current of a relatively small amount (the thin line), respectively.

On the other hand, in the three serial connection state, a current I3s may serially flow in a direction indicated with a solid line or dashed line in a combination, in each of the secondary windings 312, 322, and 332, as illustrated in (B) of FIG. 12. It is to be noted the current I3s indicated with the solid line or dashed line at this occasion may flow in a same direction as the direction in the three serial connection state described in the example embodiment ((B) of FIG. 8), and therefore description thereof is omitted.

As described, in the present modification example, it possible to obtain basically similar workings and thereby obtain similar effects.

However, in the present modification example, the eight rectifying diodes may be provided in the rectifying smoothing circuit 4A (the two rectifying diodes may be additionally provided), as described. Therefore, in the present modification example, it is possible to split the current flowing through the secondary side (in the rectifying smoothing circuit) for more rectifying diodes, as compared with the example embodiment. Hence, in the present modification example, it is possible to reduce a current load for each rectifying diode, as compared with the example embodiment.

In addition, in the switching circuit 2A of the present modification example, the resonance inductor Lr may be disposed differently from the switching circuit 2 of the example embodiment. In other words, the resonance inductor Lr coupled in series to the primary winding 321 or the primary winding 331 may be provided between the connection point (the connection point P2) of the phase-shift-side switching devices (the switching devices S3 and S4) and the connection point P3 or the connection point (the connection point P1) of the phase-locked-side switching devices (the switching devices S1 and S2). In the present modification example, this makes it possible to reduce the circulating current described above and to facilitate further enhancement in power conversion efficiency.

Modification Example 2

Figure 13:
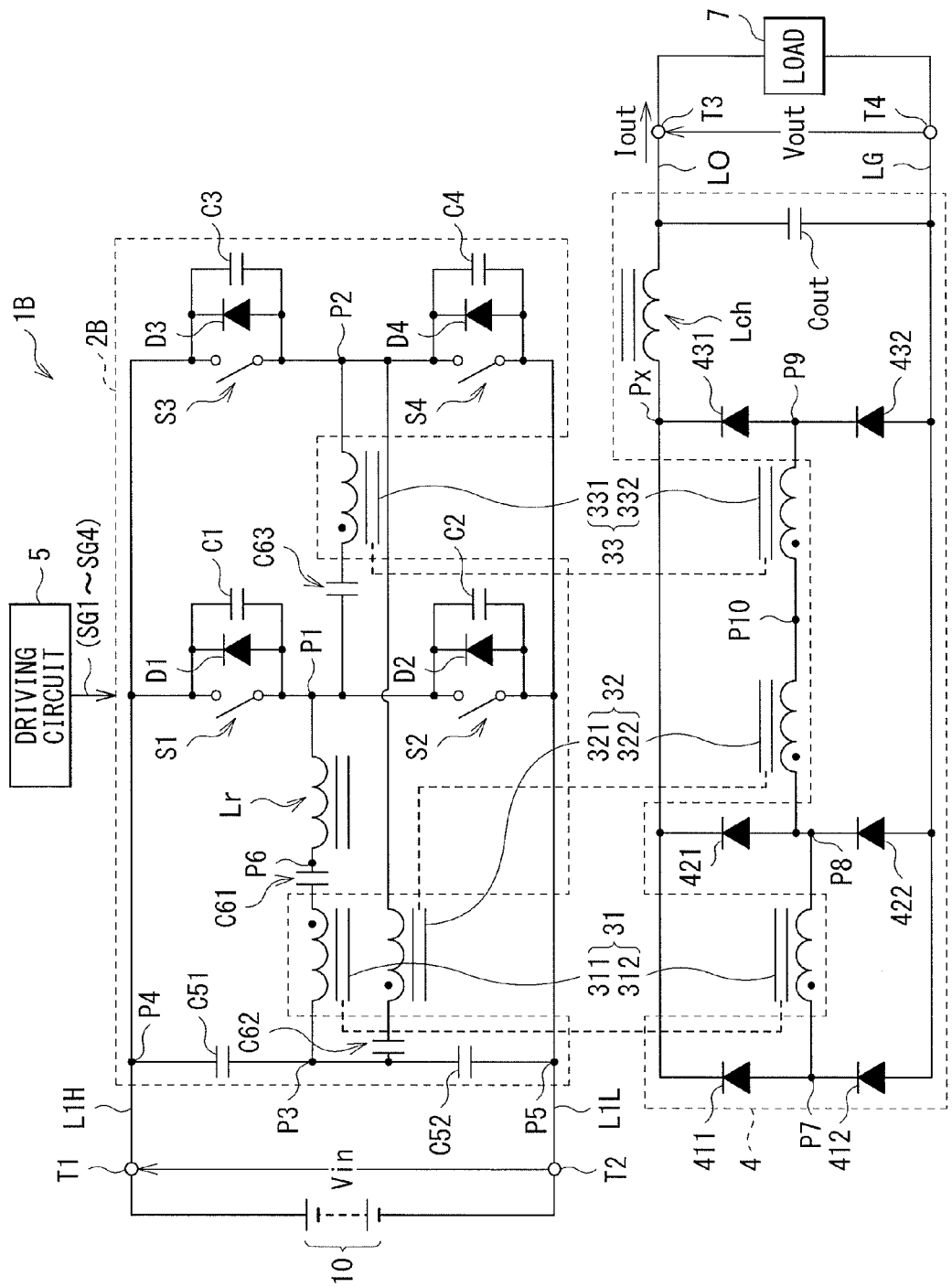
FIG. 13 is a circuit diagram of an example of an overall configuration of a switching power supply unit according to a modification example 2.

FIG. 13 illustrates, in a form of a circuit diagram, an example of an overall configuration of a switching power supply unit (a switching power supply unit 1B) according to a modification example 2.

Instead of the switching circuit 2, the switching power supply unit 1B according to the present modification example may be provided with a switching circuit 2B as described below in the switching power supply unit 1 according to the example embodiment.

The switching circuit 2B may be provided with capacitors that prevents biased excitation, i.e., capacitors C61, C62, and C63. In one specific but non-limiting example, the capacitor C61 may be inserted between the connection point P6 and the primary winding 311 of the transformer 31. The capacitor C62 may be inserted between the connection point P3 and the primary winding 321 of the transformer 32. The capacitor C63 may be inserted between the connection point P1 and the primary winding 331 of the transformer 33.

With this configuration, in the switching power supply unit 1B, it is possible to restrain (or prevent in a preferred but non-limiting example) the biased excitation in the transformers 31, 32, and 33, and to avoid various inconveniences due to the biased excitation.

It is to be noted that the switching power supply unit 1A as described in the modification example 1 may be also provided with the capacitors C61, C62, and C63 similarly to the present modification example.

Modification Example 3

Figure 14:
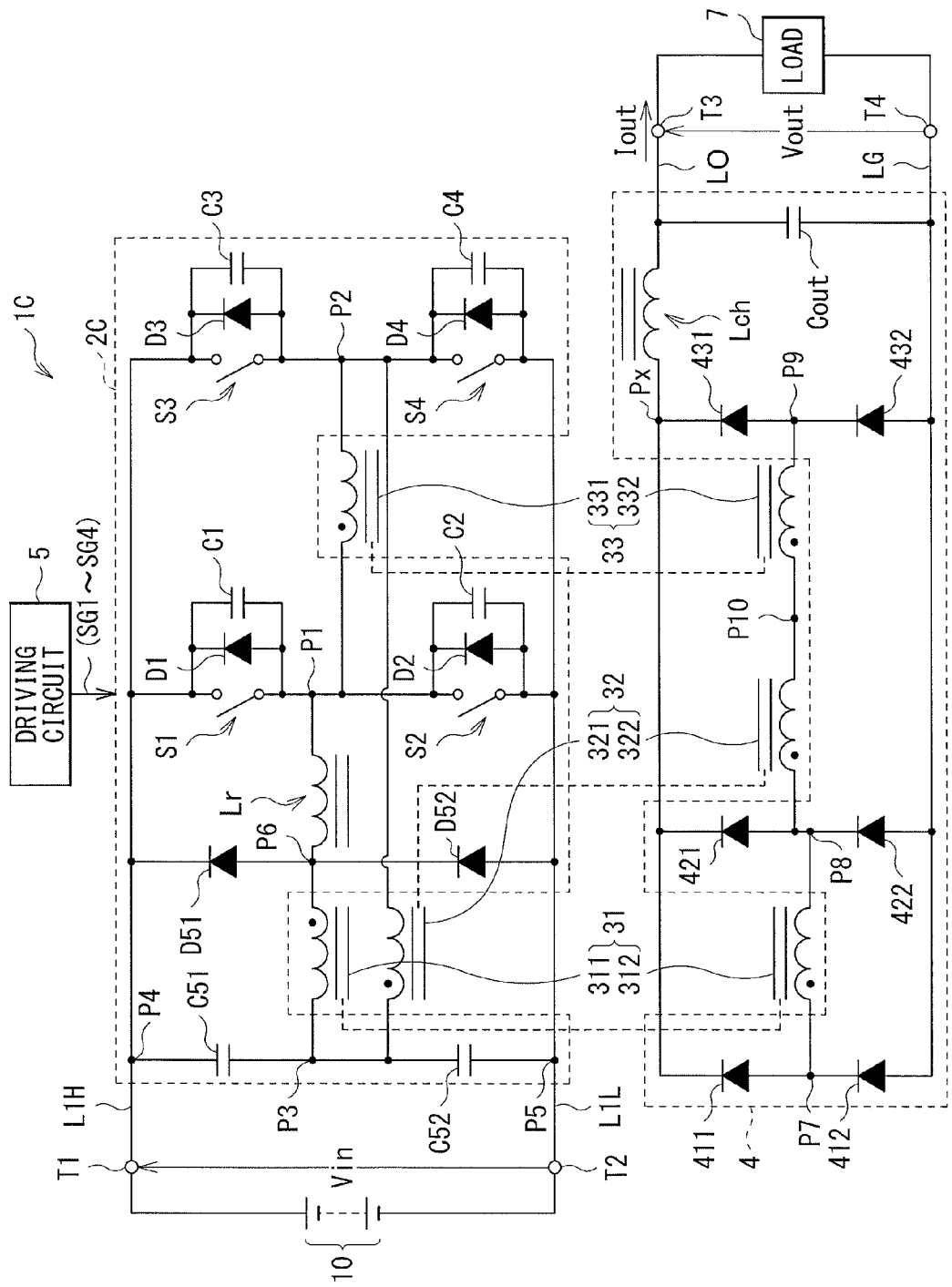
FIG. 14 is a circuit diagram of an example of an overall configuration of a switching power supply unit according to a modification example 3.

FIG. 14 illustrates, in a form of a circuit diagram, an example of an overall configuration of a switching power supply unit (a switching power supply unit 1C) according to the modification example 3.

The switching power supply unit 1C according to the present modification may be provided with a switching circuit 2C as described below, instead of the switching circuit 2 in the switching power supply unit 1 according to the forgoing example embodiment.

The switching circuit 2C may be provided with rectifying devices that may serve as reverse voltage clamps, i.e., diodes D51 and D52. In one specific but non-limiting example, the diode D51 may include an anode coupled to the connection point P6, and a cathode coupled to the primary high-voltage line L1H (the connection point P4). The diode D52 may include an anode coupled to the primary low-voltage line L1L (the connection point P5), and a cathode coupled to the connection point P6. In other words, the diodes D51 and D52 may be provided between the primary high-voltage line L1H and the primary low-voltage line L1L, and may be coupled in series to one another through the connection point P6.

With this configuration, in the switching power supply unit 1C, it is possible to restrain generation of a surge voltage resulting from the on and off operations of the switching devices S1 to S4. Hence, it is possible to reduce the loss in the rectifying diodes 411, 412, 421, 422, 431, and 432 inside the rectifying smoothing circuit 4.

It is to be noted that the switching power supply units 1A and 1B may be also provided with the diodes D51 and D52 that may serve as reverse voltage clamps, similarly to the present modification example.

Modification Example 4

Figure 15:
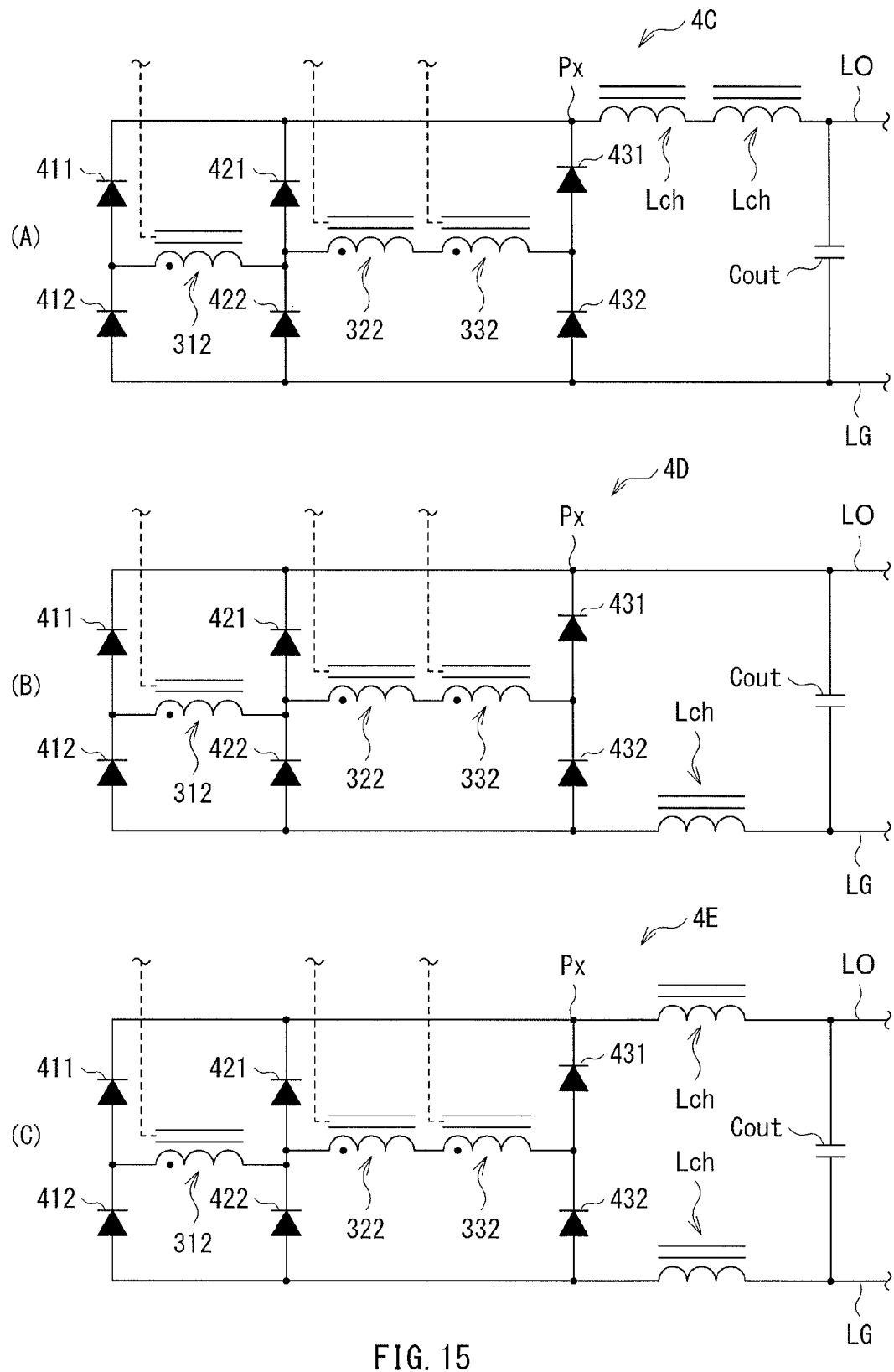
FIG. 15 is a circuit diagram of an example of a configuration of a rectifying smoothing circuit according to a modification example 4.

(A) to (C) of FIG. 15 each illustrate an example of a circuit configuration of rectifying smoothing circuits (rectifying smoothing circuits 4C, 4D, and 4E) according to a modification example 4. Specifically, (A) of FIG. 15 illustrates a circuit configuration of the rectifying smoothing circuit 4C, (B) of FIG. 15 illustrates a circuit configuration of the rectifying smoothing circuit 4D, and (C) of FIG. 15 illustrates a circuit configuration of the rectifying smoothing circuit 4E.

The rectifying smoothing circuits 4C, 4D, and 4E according to the present modification example may be different from the rectifying smoothing circuits 4 and 4A as described so far, in configuration of the choke coil Lch (e.g., the number of devices and an arrangement of devices).

In one specific but non-limiting example, in the rectifying smoothing circuit 4C illustrated in (A) of FIG. 15, the two choke coils Lch coupled in series to one another may be inserted between the connection point (the connection point Px) of the first ends in the first to third arms described above, and the first end of the output smoothing capacitor Cout, through the output line LO. In addition, the connection point of the second ends in the first to third arms may be coupled to the second end of the output smoothing capacitor Cout, on the ground line LG.

In the rectifying smoothing circuit 4D illustrated in (B) of FIG. 15, the one choke coil Lch may be inserted between the connection point of the second ends in the first to third arms, and the second end of the output smoothing capacitor Cout, through the ground line LG. Moreover, the connection point (the connection point Px) of the first ends in the first to third arms may be coupled to the first end of the output smoothing capacitor Cout, on the output line LO.

Furthermore, in the rectifying smoothing circuit 4E illustrated in (C) of FIG. 15, the one choke coil Lch may be inserted between the connection point (the connection point Px) of the first ends in the first to third arms, and the first end of the output smoothing capacitor Cout, through the output line LO. In addition, the one choke coil Lch may be inserted between the connection point of the second ends in the first to third arms, and the second end of the output smoothing capacitor Cout, through the ground line LG. It is to be noted that, in the example illustrated in (C) of FIG. 15, two windings may be provided instead of the two choke coils Lch, and these two windings may magnetically coupled together to form the one choke coil Lch.

As described, a configuration of the coke coils Lch (e.g., the number of devices and an arrangement of devices) inside the rectifying smoothing circuit may be modified in a variety of ways.

It is to be noted that, in the rectifying smoothing circuit 4A described so far as well, the number and an arrangement of the choke coils Lch may be changed, similarly to the rectifying smoothing circuits 4C, 4D, and 4E of the modification examples.

3. Other Modification Examples

Although the invention has been described in the foregoing by way of example with reference to the example embodiments and the modification examples, the technology of the invention is not limited thereto but may be modified in a wide variety of ways.

For example, in the example embodiments and the modification examples, description has been given on specific configurations of the switching circuits. However, the configurations of the switching circuits are not limited thereto, and other configurations may be adopted. Specifically, in the example embodiments and the modification examples, described is an example in which the resonance inductor Lr in the switching circuit is inserted between the phase-locked-side switching device or the phase-shift-side switching device and the primary winding. However, the position of the resonance inductor Lr is not limited thereto, and other position may be adopted. In addition, in some cases, the resonance inductor Lr may not be provided in the switching circuit. Furthermore, the resonance inductor Lr may be configured of a leakage inductor of a transformer.

Moreover, in the example embodiments and the modification examples, description has been given on specific configurations of the rectifying smoothing circuit. However, the configurations of the rectifying smoothing circuit are not limited thereto, and other configurations may be adopted. Specifically, for example, the rectifying devices in the rectifying smoothing circuit each may utilize a parasitic diode of a MOS-FET. In this case, in a preferred but non-limiting example, the MOS-FET itself may be turned on, in synchronization with a period in which the parasitic diode of the MOS-FET becomes conductive (that is, the MOS-FET may perform synchronous rectification). This allows for rectification with a smaller voltage drop. It is to be noted that, in this case, anode side of the parasitic diode may be disposed on source side of the MOS-FET, while cathode side of the parasitic diode may be disposed on drain side of the MOS-FET.

Furthermore, in the rectifying smoothing circuit, for example, the positions of the secondary windings 322 and 332 coupled in series to one another may be reversed. In other words, the secondary winding 332 may be disposed on the second arm (the rectifying diodes 421 and 422) side, and the secondary winding 322 may be disposed on the third arm (the rectifying diodes 431 and 432) side. In addition, in the rectifying smoothing circuit, for example, the first arm and the secondary winding 312 may be disposed on the opposite side (the choke coil Lch side), relative to the positions of the second arm and the secondary windings 322 and 332. In other words, the first arm (the rectifying diodes 411 and 412) and the secondary winding 312 may be disposed between the third arm (the rectifying diodes 431 and 432) and the choke coil Lch. In the example embodiments and the modification examples as described above, the number of the bridge circuits, the number of the transformers, the number of the rectifying devices, the number of the arms, and the number of other devices are not limited to physical numbers, but may refer to the numbers of those present in an equivalent circuit.

In addition, in the example embodiments and the modification examples, description has been given on an example of a DC-DC converter as an example of the switching power supply unit according to an embodiment of the invention. However, any embodiment of the invention may be applied to other kinds of switching power supply unit such as an AC-DC converter.

Moreover, the invention encompasses any possible combination of some or all of the various embodiments and the modification examples described herein and incorporated herein.

It is possible to achieve at least the following configurations from the above-described example embodiments of the invention.

(1) A switching power supply unit including:
a pair of input terminals that receives an input voltage;
a pair of output terminals that outputs an output voltage;
first to third primary windings and first to third secondary windings that form three transformers;
a switching circuit disposed between the pair of input terminals and the first to the third primary windings, and including first to fourth switching devices and first and second capacitors;
a rectifying smoothing circuit provided between the pair of output terminals and the first to the third secondary windings, and including six rectifying devices, a choke coil, and an output capacitor that is disposed between the pair of output terminals; and
a driver that performs a switching drive that controls operation of the first to the fourth switching devices, wherein
in the switching circuit,
the first and the second switching devices coupled in series to one another through a first connection point, the third and the fourth switching devices coupled in series to one another through a second connection point, and the first and the second capacitors coupled in series to one another through a third connection point are disposed in parallel to one another between the pair of input terminals,
the first primary winding is inserted between the first and the third connection points,
the second primary winding is inserted between the second and the third connection points, and
the third primary winding is inserted between the first and the second connection points, and
in the rectifying smoothing circuit,
first to third arms are disposed in parallel to one another between the pair of output terminals, the first to the third arms each having two of the rectifying devices disposed in series to one another in a same orientation,
the first secondary winding is coupled between the first and the second arms to form an H-bridge coupling,
the second and the third secondary windings coupled in series to one another are coupled between the second and the third arms to form an H-bridge coupling, and
the choke coil is disposed between the first to the third arms and the output capacitor.

(2) The switching power supply unit according to (1), wherein the transformers includes:
a first transformer that includes the first primary winding and the first secondary winding that are magnetically coupled to one another;
a second transformer that includes the second primary winding and the second secondary winding that are magnetically coupled to one another; and
a third transformer that includes the third primary winding and the third secondary winding that are magnetically coupled to one another.

(3) The switching power supply unit according to (2), wherein
a turn ratio of the first primary winding to the first secondary winding in the first transformer defined by the number of winding turns of the first primary winding/the number of winding turns of the first secondary winding is equal to a turn ratio of the second primary winding to the second secondary winding in the second transformer defined by the number of winding turns of the second primary winding/the number of winding turns of the second secondary winding, and a voltage range upon voltage conversion from the input voltage to the output voltage changes depending on magnitude of a turn ratio of the third primary winding to the third secondary winding in the third transformer defined by the number of winding turns of the third primary winding/the number of winding turns of the third secondary winding.

(4) The switching power supply unit according to any one of (1) to (3), wherein, between the second and the third arms, the second secondary winding is disposed on side on which the second arm is provided, and the third secondary winding is disposed on side on which the third arm is provided.

(5) The switching power supply unit according to any one of (1) to (4), wherein, in the rectifying smoothing circuit, a fourth arm is further disposed in parallel to the first to the third arms, the fourth arm having two other rectifying devices that are disposed in series to one another in a same orientation as an orientation in which the six rectifying devices are disposed, and the two other rectifying devices are coupled together at a connection point between the second and the third secondary windings.

(6) The switching power supply unit according to (5), further including a resonance inductor coupled in series to one of the second primary winding and the third primary winding, and provided between a connection point of phase-shift-side switching devices of the first and the second connection points and one of the third connection point and a connection point of phase-locked-side switching devices.

(7) The switching power supply unit according to any one of (1) to (4), further including a resonance inductor coupled in series to one of the first primary winding and the second primary winding, and provided between a connection point of phase-locked-side switching devices of the first and the second connection points and the third connection point.

(8) The switching power supply unit according to any one of (1) to (7), wherein the choke coil is inserted between a connection point of first ends of the first to the third arms and a first end of the output capacitor, between a connection point of second ends of the first to the third arms and a second end of the output capacitor, or both.

(9) The switching power supply unit according to (8), wherein, in each of the first to the third arms, a cathode of corresponding one of the rectifying devices is disposed on side on which corresponding one of the first ends is provided, and an anode of the corresponding one of the rectifying devices is disposed on side on which corresponding one of the second ends is provided.

(10) The switching power supply unit according to any one of (1) to (9), wherein the rectifying devices each include a parasitic diode of a field effect transistor.

(11) The switching power supply unit according to any one of (1) to (10), wherein the driver performs the switching drive to cause a connection state of the first to the third secondary windings to be switched.

(12) The switching power supply unit according to (11), wherein the driver performs the switching drive to cause the connection state of the first to the third secondary windings to be switched between a three serial connection state and a two parallel connection state or between the three serial connection state and a three parallel connection state.

(13) The switching power supply unit according to any one of (1) to (12), wherein the switching circuit includes:

a first half-bridge circuit including the first and the second switching devices and the first and the second capacitors;

a second half-bridge circuit including the third and the fourth switching devices and the first and the second capacitors; and a full-bridge circuit including the first to the fourth switching devices.

(14) The switching power supply unit according to (13), wherein the driver performs the switching drive to cause the first and the second half-bridge circuits to operate with a phase difference, and to cause phase control of the full-bridge circuit to be performed.

(15) The switching power supply unit according to (14), wherein the driver performs the switching drive to cause durations of on-duty periods of the first to the fourth switching devices to be substantially a maximum, in each of the first and the second half-bridge circuits.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A switching power supply unit comprising:
a pair of input terminals that receives an input voltage;
a pair of output terminals that outputs an output voltage;
first to third primary windings and first to third secondary windings that form three transformers;
a switching circuit disposed between the pair of input terminals and the first to the third primary windings, and including first to fourth switching devices and first and second capacitors;
a rectifying smoothing circuit provided between the pair of output terminals and the first to the third secondary windings, and including six rectifying devices, a choke coil, and an output capacitor that is disposed between the pair of output terminals; and
a driver that performs a switching drive that controls operation of the first to the fourth switching devices, wherein
in the switching circuit,
the first and the second switching devices are coupled in series to one another through a first connection point, the third and the fourth switching devices are coupled in series to one another through a second connection point, the first and the second capacitors are coupled in series to one another through a third connection point, and the coupled first and second switching devices, the coupled third and fourth switching devices and the coupled first and second capacitors are disposed in parallel to one another between the pair of input terminals, the first primary winding is inserted between the first and the third connection points, the second primary winding is inserted between the second and the third connection points, and the third primary winding is inserted between the first and the second connection points, and in the rectifying smoothing circuit, first to third arms are disposed in parallel to one another between the pair of output terminals, the first to the third arms each having two of the rectifying devices disposed in series to one another in a same orientation, the first secondary winding is coupled between the first and the second arms to form an H-bridge coupling, the second and the third secondary windings coupled in series to one another are coupled between the second and the third arms to form an H-bridge coupling, and the choke coil is disposed between the first to the third arms and the output capacitor.

2. The switching power supply unit according to claim 1, wherein the transformers includes:
a first transformer that includes the first primary winding and the first secondary winding that are magnetically coupled to one another;
a second transformer that includes the second primary winding and the second secondary winding that are magnetically coupled to one another; and
a third transformer that includes the third primary winding and the third secondary winding that are magnetically coupled to one another.

3. The switching power supply unit according to claim 2, wherein
a turn ratio of the first primary winding to the first secondary winding in the first transformer defined by the number of winding turns of the first primary winding/the number of winding turns of the first secondary winding is equal to a turn ratio of the second primary winding to the second secondary winding in the second transformer defined by the number of winding turns of the second primary winding/the number of winding turns of the second secondary winding, and
a voltage range upon voltage conversion from the input voltage to the output voltage changes depending on magnitude of a turn ratio of the third primary winding to the third secondary winding in the third transformer defined by the number of winding turns of the third primary winding/the number of winding turns of the third secondary winding.

4. The switching power supply unit according to claim 1, wherein, between the second and the third arms,
the second secondary winding is disposed on side on which the second arm is provided, and
the third secondary winding is disposed on side on which the third arm is provided.

5. The switching power supply unit according to claim 1, wherein, in the rectifying smoothing circuit,
a fourth arm is further disposed in parallel to the first to the third arms, the fourth arm having two other rectifying devices that are disposed in series to one another in a same orientation as an orientation in which the six rectifying devices are disposed, and
the two other rectifying devices are coupled together at a connection point between the second and the third secondary windings.

6. The switching power supply unit according to claim 5, further comprising a resonance inductor coupled in series to one of the second primary winding and the third primary winding, and provided between a connection point of phase-shift-side switching devices of the first and the second connection points and one of the third connection point and a connection point of phase-locked-side switching devices.

7. The switching power supply unit according to claim 1, further comprising a resonance inductor coupled in series to one of the first primary winding and the second primary winding, and provided between a connection point of phase-locked-side switching devices of the first and the second connection points and the third connection point.

8. The switching power supply unit according to claim 1, wherein
the choke coil is inserted between a connection point of first ends of the first to the third arms and a first end of the output capacitor, between a connection point of second ends of the first to the third arms and a second end of the output capacitor, or both.

9. The switching power supply unit according to claim 8, wherein, in each of the first to the third arms,
a cathode of corresponding one of the rectifying devices is disposed on side on which corresponding one of the first ends is provided, and
an anode of the corresponding one of the rectifying devices is disposed on side on which corresponding one of the second ends is provided.

10. The switching power supply unit according to claim 1, wherein the rectifying devices each comprise a parasitic diode of a field effect transistor.

11. The switching power supply unit according to claim 1, wherein the driver performs the switching drive to cause a connection state of the first to the third secondary windings to be switched.

12. The switching power supply unit according to claim 11, wherein the driver performs the switching drive to cause the connection state of the first to the third secondary windings to be switched between a three serial connection state and a two parallel connection state or between the three serial connection state and a three parallel connection state.

13. The switching power supply unit according to claim 1, wherein the switching circuit includes:
a first half-bridge circuit including the first and the second switching devices and the first and the second capacitors;
a second half-bridge circuit including the third and the fourth switching devices and the first and the second capacitors; and
a full-bridge circuit including the first to the fourth switching devices.

14. The switching power supply unit according to claim 13, wherein the driver performs the switching drive to cause the first and the second half-bridge circuits to operate with a phase difference, and to cause phase control of the full-bridge circuit to be performed.

15. The switching power supply unit according to claim 14, wherein the driver performs the switching drive to cause durations of on-duty periods of the first to the fourth switching devices to be substantially a maximum, in each of the first and the second half-bridge circuits.

* * * * *